(12) United States Patent
Xu

(10) Patent No.: US 8,906,204 B2
(45) Date of Patent: Dec. 9, 2014

(54) METHODS FOR ALCOHOL RECOVERY AND CONCENTRATION OF STILLAGE BY-PRODUCTS

(75) Inventor: Yihui Tom Xu, Newark, DE (US)

(73) Assignee: Butamax Advanced Biofuels LLC, Wilmington, DE (US)

( * ) Notice: Subject to any disclaimer, the term of this patent is extended or adjusted under 35 U.S.C. 154(b) by 648 days.

(21) Appl. No.: 12/972,631

(22) Filed: Dec. 20, 2010

(65) Prior Publication Data

US 2011/0315541 A1    Dec. 29, 2011

Related U.S. Application Data

(60) Provisional application No. 61/288,439, filed on Dec. 21, 2009.

(51) Int. Cl.
| | | |
|---|---|---|
| *B01D 3/14* | (2006.01) | |
| *B01D 1/26* | (2006.01) | |
| *B01D 3/36* | (2006.01) | |
| *C12C 11/11* | (2006.01) | |
| *B01D 3/00* | (2006.01) | |
| *B01D 3/40* | (2006.01) | |

(52) U.S. Cl.
CPC *B01D 1/26* (2013.01); *B01D 3/146* (2013.01); *C12C 11/11* (2013.01); *B01D 3/40* (2013.01); *B01D 3/005* (2013.01); *B01D 3/36* (2013.01)
USPC .............. 203/18; 203/59; 203/60; 203/61; 203/62; 203/63; 203/71; 203/79; 203/97; 426/493; 426/494; 99/278; 159/17.1; 159/17.2

(58) Field of Classification Search
CPC ........ B01D 3/001; B01D 3/005; B01D 3/146; B01D 3/36; B01D 3/40; B01D 1/26; C12C 11/11; C07C 29/80; C07C 29/82; C07C 29/84; C07C 31/12
USPC .......... 202/153, 155, 156; 203/18, 59, 60, 61, 203/62, 63, 71, 79, 97; 426/492, 493, 494; 99/278, 323.1; 159/17.1, 17.2
See application file for complete search history.

(56) References Cited

U.S. PATENT DOCUMENTS

| | | | |
|---|---|---|---|
| 2,126,974 A | * | 8/1938 | Reich .............................. 203/27 |
| 3,807,479 A | | 4/1974 | Hubert et al. |

(Continued)

FOREIGN PATENT DOCUMENTS

| | | |
|---|---|---|
| FR | 768994 | 8/1934 |
| WO | 2004088230 | 10/2004 |
| WO | 2009079362 | 6/2009 |

OTHER PUBLICATIONS

Minton, P. E. (1986) "Multi-Effect Evaporators" in Handbook of Evaporation Technology, pp. 166-171, William Andrew Publishing/Noyes.

(Continued)

*Primary Examiner* — Nina Bhat
*Assistant Examiner* — Jonathan Miller

(57) ABSTRACT

Systems and methods for separating an alcohol, and in particular butanol, from a fermented feed and concentrating thin stillage into syrup includes operation of one or more alcohol recovery distillation columns using the heat supplied by steam generated from concentration of the thin stillage in a multi-train, multi-effect evaporation system.

16 Claims, 6 Drawing Sheets

(56) References Cited

U.S. PATENT DOCUMENTS

| | | | |
|---|---|---|---|
| 4,309,254 | A | 1/1982 | Dahlstrom et al. |
| 4,865,973 | A * | 9/1989 | Kollerup et al. ............. 435/43 |
| 7,297,236 | B1 | 11/2007 | Vander Griend |
| 7,572,353 | B1 | 8/2009 | Vander Griend |
| 7,932,063 | B2 | 4/2011 | Dunson et al. |
| 8,101,808 | B2 * | 1/2012 | Evanko et al. ............. 568/916 |
| 8,304,588 | B2 * | 11/2012 | Evanko et al. ............. 568/916 |
| 2009/0171129 | A1 * | 7/2009 | Evanko et al. ............. 568/916 |
| 2009/0305370 | A1 | 12/2009 | Grady et al. |
| 2011/0097773 | A1 | 4/2011 | Grady et al. |
| 2011/0162954 | A1 | 7/2011 | Xu et al. |

OTHER PUBLICATIONS

Dale, Rhys T. and Wallace E. Tyner, Staff Paper # 06-04: "Economic and Technical Analysis of Ethanol Dry Milling: Model Description" (2006), Agricultural Economics Department, Purdue University.

Bellion et al., Microb. Growth C1 Compd., [Int. Symp.], 7th (1993), 415 32, Editor(s): Murrell, J. Collin; Kelly, Don P. Publisher: Intercept, Andover, UK.

Sulter et al., "Proliferation and metabolic significance of peroxisomes in *Candida boidinii* during growth on D-alanine or oleic acid as the sole carbon source", Arch. Microbiol., vol. 153, pp. 485 489 (1990).

International Search Report and Written Opinion of corresponding PCT/US2010/061512 mailed Jun. 24, 2011.

Dale, Rhys T. and Wallace E. Tyner, Staff Paper # 06-05: "Economic and Technical Analysis of Ethanol Dry Milling: Model User's Manual" (2006), Agricultural Economics Department, Purdue University.

* cited by examiner

METHODS FOR ALCOHOL RECOVERY AND CONCENTRATION OF STILLAGE BY-PRODUCTS

CROSS-REFERENCE TO RELATED APPLICATIONS

This application claims the benefit of priority of U.S. Provisional Application Nos. 61/288,439, filed on Dec. 21, 2009, the entirety of which is herein incorporated by reference.

FIELD OF THE INVENTION

The present invention relates to processes for recovering alcohol produced in a fermentative process and concentrating stillage by-products, and particularly, to recovering alcohol utilizing waste heat generated from evaporating water from the stillage by-products.

BACKGROUND OF THE INVENTION

A fuel grade alcohol production process, e.g, for the production of ethanol, typically includes fermentation of a mixture of water and milled grain to yield alcohol, distillation of the fermented mixture to recover alcohol as a top product and distillery bottom by-products, which includes grain solids and thin stillage of dissolved solids in water. The distillary by-products are typically concentrated by evaporation of water therefrom, to yield Distiller's Dried Grains with Solubles (DDGS), a valuable feed for livestock.

To make fuel grade alcohol production more economical, it is desirable to reduce the external energy and water required to operate the various steps in the alcohol production process. This can be achieved, for example by integrating the waste heat of one unit operation as a heat source for use in another unit operation of the process, process to process heat exchange, and recycling waste water streams back into the process. For example, U.S. Pat. No. 7,297,236 to Vander Griend describes an ethanol production process in which the steam generated from concentrating the thin stillage can provide heat for operation of the distillation of the fermented mixture.

In the ethanol production process described in U.S. Pat. No. 7,297,236, a series arrangement of four first effect evaporators and four second effect evaporators concentrate the thin stillage, and the second effect steam from the second effect evaporator is used to operate the distillation portion of the process. An overview of an exemplary conventional dry grind ethanol plant 100 incorporating four first effect evaporators and four second effect evaporators, such as that described in U.S. Pat. No. 7,297,236, will be described with reference to FIG. 1. As shown in FIG. 1, ethanol plant 100 includes a fermentation portion 110 where hot water 104 and milled grain 102 (e.g., corn) are mixed to form a mash, cooked, and fermented by yeast in a fermentor to yield a fermented feed 106. Fermented feed may be sent to a degasser (not shown) to remove any non-condensable gases and then separated in a beer column 120 into an overhead ethanol-rich vapor 108 (e.g., 120 proof) and beer bottoms 116. The non-condensable gases from the degasser may be further processed to recover any ethanol as a condensate (not shown) that can be fed back to a beer column 120, and the gas sent to a scrubber (not shown). The scrubber water (not shown) may be recycled to the fermentation portion 110 of the process.

The ethanol-rich vapor 108 from the beer column 120 enters a rectifier column 130 where ethanol vapor having a higher concentration of ethanol (e.g., 190 proof) is generated as an overhead vapor 132. Steam 129 from heating the milled grains and water in fermentation portion 110 may also be fed to a stripping portion of the rectifier column to assist in stripping ethanol in the liquid at the column bottom. The 190 proof ethanol vapor 132 is condensed and dehydrated with heaters in a molecular sieve at portion 140 to yield a high grade ethanol vapor product 112 (e.g., 199.5 proof). Ethanol vapor product 112 may then be cooled and condensed by a cooler/condenser 145 to yield a liquid ethanol product 112". The molecular sieve may be regenerated by removing the absorbed water, which can include some ethanol. The removed water may be cooled/condensed by a regenerate cooler/condenser (not shown) and returned to the rectifier 130 via regenerate stream 114. If non-condensible gases are present in the rectifier column, these gases may be recovered and also sent to the scrubber (not shown).

Beer bottoms 116 from the beer column 120 containing mostly water, dissolved materials and unfermented solids from the milled grain, may be sent to a centrifuge 160 and separated into a mostly solid component known as distiller's grains 172 and a mostly liquid component known as thin stillage 118. A portion 118' of the thin stillage may be reintroduced into the fermented mixture at fermentation portion 110, and the remainder sent to an evaporation portion 150 of the plant. In the evaporation portion 150, water is evaporated from thin stillage 118 to produce a syrup 158. The evaporation portion includes four first effect evaporators 151, 152, 153 and 154 connected in series (via respective lines 157) and four second effect evaporators 161, 162, 163 and 164 connected in series (via respective lines 157). The first three evaporators 151, 152 and 153 of the first effect are operated using plant steam 190 as a heat source for evaporating water from the thin stillage, and the fourth first effect evaporator 154 is operated using ethanol vapor 112' taken from the ethanol vapor product stream 112. The first effect evaporators incrementally evaporate water from the thin stillage to produce mid stillage 156. Mid stillage 156 is sent to the first second effect evaporator 161, and then in series to the subsequent second effect evaporators 162, 163 and 164 that incrementally evaporate water from the mid stillage to produce syrup 158. Syrup 158 can be added to the distiller's grains 172 in a mixer 170 to produce a mixed feed 174 that is dried in a distiller's grain dryer 180 to yield DDGS 182.

The second effect evaporators are operated using first effect steam 192 generated in the first effect evaporators. Second effect steam 194 generated in the second effect evaporators is delivered to provide heat for operation of the beer column 120. Steam condensate from the evaporators is discharged through a condensate line (not shown) and may be heated and recycled to the fermentation portion 110 of the process. U.S. Pat. No. 7,297,236 describes providing valves on the various lines leading to the evaporators so that any one of the four first effect evaporators 151, 152, 153 and 154, and any one of the four second effect evaporators 161, 162, 163 and 164 can be taken off-line and by-passed for maintenance.

In recovery processes for other alcohols, the use of second effect steam as described in U.S. Pat. No. 7,297,236 may not be an efficient integration of waste heat. In addition, the production of other alcohols may not yield a superheated alcohol vapor product that can be integrated as a heat source for the evaporators, as in ethanol plant 200 and the ethanol process described in U.S. Pat. No. 7,297,236. For example, butanol is an alcohol with a variety of applications, such as use as a fuel additive, as a blend component to diesel fuel, as a feedstock chemical in the plastics industry, and as a food-grade extractant in the food and flavor industry. Butanol is favored as a fuel or fuel additive as it has a higher energy density than ethanol and yields only $CO_2$ and little or no $SO_X$ or $NO_X$ when burned in the standard internal combustion engine. Additionally, butanol is less corrosive than ethanol, the most preferred fuel additive to date. Each year 10 to 12 billion pounds of butanol are produced by petrochemical means. As the projected demand for butanol increases, interest in producing butanol from renewable resources such as corn, sugar cane, or cellulosic feeds by fermentation is expanding.

Butanol production can be less energy efficient than ethanol production for a given milled grain load. The fermented mixture in a butanol production process typically has a lower concentration of butanol because of butanol's toxicity to the butanol-producing microorganisms in the fermentor. In a fermentative process to produce butanol, in situ product removal advantageously reduces butanol inhibition of the microorganism and improves fermentation rates by controlling butanol concentrations in the fermentation mixture. Technologies for in situ product removal include stripping, adsorption, pervaporation, membrane solvent extraction, and liquid-liquid extraction. In liquid-liquid extraction, an extractant is contacted with the fermentation mixture to partition the butanol between the fermentation broth and the extractant phase. The butanol and the extractant are recovered by a separation process, for example by distillation. In the recovery process, the butanol can also be separated from any water, non-condensable gas, and/or fermentation by-products which may have been removed from the fermentation broth through use of the extractant. Thus, butanol production may include unit operations, absent in ethanol production, for recovering butanol from the butanol-containing extractant phase. Moreover, in the production of butanol, a distillation portion of a butanol recovery process may not yield a hot butanol vapor product. Also, second effect steam may be more heat than is needed to operate the distillation columns for butanol recovery.

What are needed are systems and methods for recovering alcohol, and in particular butanol, that are energy efficient while still being flexible in operation. The present application satisfies these and other needs, and provides further related advantages, as will be made apparent by the description of the embodiments that follow.

SUMMARY OF THE INVENTION

The present invention provides systems and processes for recovering an alcohol from a fermented feed using distillation, and concentrating thin stillage by-products into syrup using additional evaporators in alternative configurations than those found in existing ethanol plants at similar size. In one embodiment, the present invention provides systems and processes for recovering butanol from an extractant that efficiently utilizes waste heat generated from the concentration of the stillage by-products. In one embodiment, the present invention provides a method for separating alcohol from a fermented feed and concentrating thin stillage into syrup. The method includes separating at least a portion of a fermented feed in a beer column maintained at a pressure below atmospheric pressure to produce: (i) an alcohol-rich vapor and (ii) an alcohol-poor beer bottoms including thin stillage.

Accordingly, provided herein is a method for separating an alcohol from a fermented feed and concentrating thin stillage into syrup, comprising: separating at least a portion of a fermented feed in a beer column maintained at a pressure below atmospheric pressure to produce: (i) an alcohol-rich vapor and (ii) an alcohol-poor beer bottoms including thin stillage; evaporating water from the thin stillage to produce first mid stillage and first effect steam using at least two first effect evaporators arranged in series; evaporating water from the first mid stillage produced with heat from the first effect steam to produce second mid stillage and second effect steam using at least two second effect evaporators arranged in series; evaporating water from the second mid stillage produced with heat from the second effect steam to produce a syrup using at least one third effect evaporator; and using at least a portion of a last effect steam produced by a last effect evaporator to supply heat for distilling the fermented feed in the beer column. In embodiments, the method comprises three effects comprising three first effect evaporators arranged in series, three second effect evaporators arranged in series, and three third effect evaporators arranged in series. In embodiments, the method comprises four effects comprising two first effect evaporators arranged in series, two second effect evaporators arranged in series, two third effect evaporators arranged in series, and further comprising two fourth effect evaporators arranged in series. In embodiments, the method comprises three effects comprising four first effect evaporators arranged in series, four second effect evaporators arranged in series, and at least one third effect evaporator. In embodiments, the method comprises two to four third effect evaporators arranged in series. In embodiments, the alcohol-rich vapor distilled off the fermented feed in the beer column is a butanol-rich vapor. In embodiments, the alcohol-rich vapor distilled off the fermented feed in the beer column is a butanol-rich vapor and the fermented feed includes a solvent. In embodiments, the thin stillage primarily includes water. In embodiments, the thin stillage comprises a solvent, the solvent comprising at least one of $C_{12}$ to $C_{22}$ fatty alcohols, $C_{12}$ to $C_{22}$ fatty acids, esters of $C_{12}$ to $C_{22}$ fatty acids, $C_{12}$ to $C_{22}$ fatty aldehydes, or $C_{12}$ to $C_{22}$ fatty amides. In embodiments, the method further comprises separating the fermented feed into a solvent-rich portion and a solvent-poor portion, the solvent-poor portion being the portion of the fermented feed distilled in the beer column; separating the solvent-rich portion in a solvent column to produce a solvent-poor and alcohol-rich vapor and a solvent-rich and alcohol-poor liquid, the solvent column being operated in parallel with the beer column and maintained at a pressure below atmospheric pressure; and using a portion of the last effect steam to supply sufficient heat for distilling the solvent-rich portion of the fermented feed in the solvent column. In embodiments, the method further comprises: condensing the butanol-rich vapor produced in the beer column to produce a first butanol-rich liquid; condensing the solvent-poor vapor produced in the solvent column to produce a solvent-poor liquid; combining the first butanol-rich liquid and the solvent-poor liquid to produce a liquid including butanol; separating the liquid including butanol to produce a second butanol-rich liquid and a butanol-poor liquid; and distilling the second butanol-rich liquid in a distillation column to produce a liquid bottom product of substantially 100 wt % butanol. In embodiments, the first effect evaporators are arranged so that one of the evaporators can be bypassed while the remaining first effect evaporators continue to operate. In embodiments, the second effect evaporators are arranged so that one of the evaporators can be bypassed while the remaining second effect evaporators continue to operate. In embodiments, the second effect evaporators are arranged so that one of the evaporators can be bypassed while the remaining second effect evaporators continue to operate. In embodiments, the third effect evaporators are arranged so that one of the evaporators can be bypassed while the remaining third effect evaporators continue to operate. In embodiments, the third effect evaporators are arranged so that one of the evaporators can be bypassed while the remaining third effect evaporators continue to operate. In embodiments, the fourth effect evaporators are arranged so that one of the evaporators can be bypassed while the remaining third effect evaporators continue to operate. In embodiments, the method further comprises feeding the thin stillage produced in the beer column to the first effect evaporators in parallel. In embodiments, the method further comprises using plant steam to supply sufficient heat for evaporating water from the thin stillage in the first effect evaporators.

Also provided herein is a system for separating alcohol from a fermented feed and concentrating thin stillage into syrup, comprising: a beer column having an inlet for receiving a fermented feed, the beer column having a top outlet for discharging an alcohol-rich vapor and a beer bottom outlet for discharging alcohol-poor beer bottoms including distiller's grains and thin stillage, the thin stillage primarily including water and, optionally, solvent; a multi-effect evaporation system for concentrating the thin stillage, the multi-effect evaporation system comprising: a set of first effect evaporators for evaporating water from the thin stillage to produce first effect steam and first mid stillage, the first effect evaporators including at least a first and a second first effect evaporator connected in series, wherein the first first effect evaporator has a stillage inlet in communication with the beer bottom outlet of the beer column for receiving the thin stillage of the beer bottoms and a stillage outlet for discharging stillage, wherein each subsequent first effect evaporator has a stillage inlet in communication with the stillage outlet of the previous first effect evaporator, each of the first effect evaporators having a vapor inlet for receiving heated vapor from a vapor source, each first effect evaporator is configured to cause the heated vapor to heat-exchange with the thin stillage such that water is incrementally evaporated from the thin stillage to produce the first mid stillage and the first effect steam, each first effect evaporator having a first effect steam outlet for releasing the first effect steam; a set of second effect evaporators for evaporating water from the first mid stillage to produce second effect steam and second mid stillage, the second effect evaporators including at least a first and a second second effect evaporator connected in series, wherein the first second effect evaporator has a stillage inlet connected to the stillage outlet of the last first effect evaporator and a stillage outlet for discharging stillage, wherein each subsequent second effect evaporator has a stillage inlet in communication with the stillage outlet of the previous second effect evaporator, each of the second effect evaporators having a vapor inlet connected to the first effect steam outlets, each second effect evaporator is configured to cause the first effect steam to heat-exchange with the first mid stillage such that water is incrementally evaporated from the first mid stillage to produce second mid stillage and the second effect steam, each second effect evaporator having a second effect steam outlet for releasing the second effect steam; and a set of third effect evaporators for evaporating water from the second mid stillage to produce third effect steam and syrup, the third effect evaporators including at least a first and a second third effect evaporator connected in series, wherein the first third effect evaporator has a stillage inlet connected to the stillage outlet of the last second effect evaporator and a stillage outlet for discharging stillage, wherein each subsequent third effect evaporator has a stillage inlet in communication with the stillage outlet of the previous third effect evaporator, each of the third effect evaporators having a vapor inlet connected to the second effect steam outlets, each third effect evaporator is configured to cause the second effect steam to heat-exchange with the second mid stillage such that water is incrementally evaporated from the second mid stillage to produce the syrup and the third effect steam, each third effect evaporator having a third effect steam outlet for releasing the third effect steam; and a steam line connecting the last effect steam outlets of the last effect evaporators to a vapor inlet of the beer column such that at least a portion of the last effect steam provides heat for operation of the beer column. In embodiments, the system comprises three effects comprising three first effect evaporators arranged in series, three second effect evaporators arranged in series, and three third effect evaporators arranged in series. In embodiments, the system comprises four effects comprising two first effect evaporators arranged in series, two second effect evaporators arranged in series, two third effect evaporators arranged in series, and further comprising two fourth effect evaporators arranged in series. In embodiments, the system comprises three effects comprising four first effect evaporators arranged in series, four second effect evaporators arranged in series, and at least one third effect evaporator. In embodiments, the system comprises two to four third effect evaporators arranged in series. In embodiments, the system comprises a separator configured to separate the thin stillage from the distiller's grains of the beer bottoms; a beer bottoms line connecting the separator and the beer bottoms outlet; and a thin stillage line connecting the separator and the stillage inlet of the first first effect evaporator. In embodiments, the separator is a centrifuge or filter press. In embodiments, the system further comprises a second and a third thin stillage line connected to the first thin stillage line, the stillage inlet of each of the second and third first effect evaporators being in communication with the respective second and third thin stillage lines, whereby the first, second and third first effect evaporators may receive thin stillage from the separator in parallel. In embodiments, a pressure in the beer column at the vapor inlet is below atmospheric pressure. In embodiments, the system further comprises a solvent column having an inlet for receiving a portion of the fermented feed that includes a solvent, the solvent column having a top outlet for discharging a solvent-poor and alcohol-rich vapor and a bottom outlet for a solvent-rich and alcohol-poor liquid, the solvent column being operated in parallel with the beer column; and a second steam line connecting the last effect steam outlets of the last effect evaporators to a vapor inlet of the solvent column such that a portion of the last effect steam provides heat for operation of the solvent column, wherein a pressure in the solvent column at the vapor inlet is below atmospheric pressure. In embodiments, the first effect evaporators have valves for isolating the evaporator and bypass valves associated therewith for redirecting stillage into a line which bypasses the evaporator and reroutes the stillage to the stillage inlet of the next evaporator. In embodiments, the second effect evaporators have valves for isolating the evaporator and bypass valves associated therewith for redirecting stillage into a line which bypasses the evaporator and reroutes the stillage to the stillage inlet of the next evaporator. In embodiments, the third effect evaporators have valves for isolating the evaporator and bypass valves associated therewith for redirecting stillage into a line which bypasses the evaporator and reroutes the stillage to the stillage inlet of the next evaporator. In embodiments, the fourth effect evaporators have valves for isolating the evaporator and bypass valves associated therewith for redirecting stillage into a line which bypasses the evaporator and reroutes the stillage to the stillage inlet of the next evaporator. In embodiments, each of the first, second and third effect evaporators have valves for isolating the evaporator and bypass valves associated therewith for redirecting stillage into a line which bypasses the evaporator and reroutes the stillage to the stillage inlet of the next evaporator. In embodiments, the top outlet of the beer column discharges a butanol-rich vapor. In embodiments, the thin stillage comprises a solvent, the solvent comprising at least one of $C_{12}$ to $C_{22}$ fatty alcohols, $C_{12}$ to $C_{22}$ fatty acids, esters of $C_{12}$ to $C_{22}$ fatty acids, $C_{12}$ to $C_{22}$ fatty aldehydes, or $C_{12}$ to $C_{22}$ fatty amides. In embodiments, the thin stillage comprises oil from the fermentation feedstock.

Provided herein is a method for separating an alcohol from a fermented feed and concentrating thin stillage into syrup, comprising: separating at least a portion of a fermented feed in a beer column maintained at a pressure below atmospheric pressure to produce: (i) an alcohol-rich vapor and (ii) an alcohol-poor beer bottoms including thin stillage; evaporating water from the thin stillage to produce first mid stillage and first effect steam using at least two first effect evaporators arranged in series; evaporating water from the first mid stillage produced with heat from the first effect steam to produce second mid stillage and second effect steam using at least two second effect evaporators arranged in series; evaporating water from the second mid stillage produced with heat from the second effect steam to produce a syrup using at least one third effect evaporator; and using at least a portion of the last effect steam to supply heat for distilling the fermented feed in the beer column. In embodiments, the method comprises three first effect evaporators arranged in series, three second effect evaporators arranged in series, and three third effect evaporators arranged in series. In embodiments, the method comprises two first effect evaporators arranged in series, two second effect evaporators arranged in series, two third effect evaporators arranged in series, and further comprising two fourth effect evaporators arranged in series. In embodiments, the method comprises four first effect evaporators arranged in series, four second effect evaporators arranged in series, and at least one third effect evaporator. In embodiments, the method comprises two to four third effect evaporators arranged in series. In embodiments, the alcohol-rich vapor distilled off the fermented feed in the beer column is a butanol-rich vapor. In embodiments, the alcohol-rich vapor distilled off the fermented feed in the beer column is a butanol-rich vapor and the fermented feed includes a solvent. In embodiments, the methods further comprise separating the fermented feed into a solvent-rich portion and a solvent-poor portion, the solvent-poor portion being the portion of the fermented feed distilled in the beer column; separating the solvent-rich portion in a solvent column to produce a solvent-poor and alcohol-rich vapor and a solvent-rich and alcohol-poor liquid, the solvent column being operated in parallel with the beer column and maintained at a pressure below atmospheric pressure; and using a portion of the last effect steam to supply sufficient heat for distilling the solvent-rich portion of the fermented feed in the solvent column. In embodiments, the thin stillage comprises mainly water. In embodiments, the thin stillage comprises solvent. In embodiments, the thin stillage comprises a solvent, the solvent comprising at least one of $C_{12}$ to $C_{22}$ fatty alcohols, $C_{12}$ to $C_{22}$ fatty acids, esters of $C_{12}$ to $C_{22}$ fatty acids, $C_{12}$ to $C_{22}$ fatty aldehydes, or $C_{12}$ to $C_{22}$ fatty amides. In embodiments, the thin stillage comprises oil from the fermentation feedstock.

Also provided herein is a method for separating an alcohol from a fermented feed and concentrating thin stillage into syrup, comprising: separating at least a portion of a fermented feed in a beer column maintained at a pressure below atmospheric pressure to produce: (i) an alcohol-rich vapor and (ii) an alcohol-poor beer bottoms including thin stillage; evaporating water from the thin stillage to produce first mid stillage and first effect steam using three first effect evaporators arranged in series; evaporating water from the first mid stillage produced with heat from the first effect steam to produce second mid stillage and second effect steam using three second effect evaporators arranged in series; evaporating water from the second mid stillage produced with heat from the second effect steam to produce a syrup using three third effect evaporators arranged in series; and using at least a portion of the third effect steam to supply heat for distilling the fermented feed in the beer column. In embodiments, the thin stillage comprises mainly water. In embodiments, the thin stillage comprises solvent. In embodiments, the thin stillage comprises oil derived from the fermentation feedstock. In embodiments, the fermented feed includes a solvent, and the methods further comprise separating the fermented feed into a solvent-rich portion and a solvent-poor portion, the solvent-poor portion being the portion of the fermented feed distilled in the beer column; separating the solvent-rich portion in a solvent column to produce a solvent-poor and alcohol-rich vapor and a solvent-rich and alcohol-poor liquid, the solvent column being operated in parallel with the beer column and maintained at a pressure below atmospheric pressure; and using a portion of the third effect steam to supply sufficient heat for distilling the solvent-rich portion of the fermented feed in the solvent column. In embodiments, the alcohol-rich vapor distilled off the fermented feed in the beer column is a butanol-rich vapor. In embodiments, the method further comprise scondensing the butanol-rich vapor produced in the beer column to produce a first butanol-rich liquid; condensing the solvent-poor vapor produced in the solvent column to produce a solvent-poor liquid; combining the first butanol-rich liquid and the solvent-poor liquid to produce a liquid including butanol; separating the liquid including butanol to produce a second butanol-rich liquid and a butanol-poor liquid; and distilling the second butanol-rich liquid in a distillation column to produce a liquid bottom product of substantially 100 wt % butanol.

Also provided is a method for separating butanol from a fermented feed and concentrating thin stillage into syrup, comprising fermenting a mixture including water and milled grain to produce a fermented feed containing butanol; adding a solvent to the fermented feed to produce a two-phase mixture comprising a solvent-rich phase and a solvent-poor phase; separating the solvent-rich phase from the solvent-poor phase; distilling the solvent-poor phase in a beer column maintained at a pressure below atmospheric pressure to produce: (i) a butanol-rich vapor and (ii) a butanol-poor beer bottoms including thin stillage, the thin stillage primarily including water, distilling the solvent-rich phase in a solvent column to produce a solvent-poor and butanol-rich vapor and a solvent-rich and butanol-poor liquid, the solvent column being operated in parallel with the beer column and maintained at a pressure below atmospheric pressure; evaporating water from the thin stillage to produce first mid stillage and first effect steam using three first effect evaporators arranged in series; evaporating water from the first mid stillage produced with heat from the first effect steam to produce second mid stillage and second effect steam using three second effect evaporators arranged in series; evaporating water from the second mid stillage produced with heat from the second effect steam to produce a syrup using three third effect evaporators arranged in series; using a portion of the third effect steam to supply heat for distilling the solvent-rich phase in the solvent column; condensing the butanol-rich vapor produced in the beer column to produce a first butanol-rich liquid; condensing the solvent-poor vapor produced in the solvent column to produce a solvent-poor liquid; combining the first butanol-rich liquid and the solvent-poor liquid to produce a liquid including butanol; separating the liquid including butanol to produce a second butanol-rich liquid and a butanol-poor liquid; and distilling the second butanol-rich liquid in a distillation column to produce a liquid bottom product of substantially 100 wt % butanol. In embodiments, the methods further comprise using a second portion of the third effect steam to supply heat for distilling the solvent-poor phase in the beer column.

In embodiments, the methods provided further comprise mechanically separating solids from the beer bottoms. In embodiments, the methods further comprise drying the separated solids and the syrup produced by evaporating water from the thin stillage to produce feed for livestock. In embodiments, the three first effect evaporators are arranged so that one of the evaporators can be bypassed while the remaining first effect evaporators continue to operate. In embodiments, the three second effect evaporators are arranged so that one of the evaporators can be bypassed while the remaining second effect evaporators continue to operate. In embodiments, the three second effect evaporators are arranged so that one of the evaporators can be bypassed while the remaining second effect evaporators continue to operate. In embodiments, the three third effect evaporators are arranged so that one of the evaporators can be bypassed while the remaining third effect evaporators continue to operate. In embodiments, the three third effect evaporators are arranged so that one of the evaporators can be bypassed while the remaining third effect evaporators continue to operate. In embodiments, the methods further comprise feeding the thin stillage produced in the beer column to the three first effect evaporators in parallel. In embodiments, the methods further comprise using plant steam to supply sufficient heat for evaporating water from the thin stillage in the first effect evaporators.

In embodiments, evaporating water from the second mid stillage produces a syrup having a concentration of water by weight that is about half of a concentration of water by weight in the thin stillage. In embodiments, evaporating water from the second mid stillage produces a syrup having a concentration of water by weight that is from about 40% to about 65%. In embodiments, the third effect steam is used to supply sufficient heat for distilling the fermented feed in the beer column. In embodiments, the third effect steam is used to supply sufficient heat for distilling the solvent-rich portion of the fermented feed in the solvent column.

In embodiments, the methods further comprise using plant steam to supply heat for distilling the fermented feed in the beer column, wherein the plant steam and the at least a portion of the last effect steam supply sufficient heat for distilling the fermented feed in the beer column. In embodiments, the methods further comprise using plant steam to supply heat for distilling the solvent-rich portion of the fermented feed in the solvent column, wherein the plant steam and the at least a portion of the last effect steam supply sufficient heat for distilling the solvent-rich portion in the solvent column.

In embodiments, the first effect steam generated by evaporating water from the thin stillage in the first effect evaporators is maintained at a pressure of about 20 psia, and wherein the third effect steam generated by evaporating water from the second mid stillage in the third effect evaporators is maintained at a pressure of about 9.3 psia. In embodiments, a top pressure of the beer column is maintained at about 7 psia. In embodiments, a pressure drop in the beer column is maintained from about 1.5 psi to about 2.0 psi. In embodiments, a top pressure of the solvent distillation column is maintained at about 7 psia. In embodiments, a pressure drop in the solvent column is maintained from about 1.5 psi to about 2.0 psi. In embodiments, the third effect steam generated by evaporating water from the second mid stillage in the third effect evaporators is maintained at a temperature of from about 80° C. to about 95° C.

In embodiments, the last effect steam generated by evaporating water in the last effect evaporators is maintained at a temperature of from about 80° C. to about 95° C. In embodiments, the first effect steam generated by evaporating water from the thin stillage in the first effect evaporators is maintained at a temperature of from about 105° C. to about 115° C.

Also provided herein is a system for separating alcohol from a fermented feed and concentrating thin stillage into syrup, comprising: a beer column having an inlet for receiving a fermented feed, the beer column having a top outlet for discharging an alcohol-rich vapor and a beer bottom outlet for discharging alcohol-poor beer bottoms including distiller's grains and thin stillage, the thin stillage primarily including water; a multi-effect evaporation system for concentrating the thin stillage, the multi-effect evaporation system comprising: a set of first effect evaporators for evaporating water from the thin stillage to produce first effect steam and first mid stillage, the first effect evaporators including a first, a second, and a third first effect evaporator connected in series, wherein the first first effect evaporator has a stillage inlet in communication with the beer bottom outlet of the beer column for receiving the thin stillage of the beer bottoms and a stillage outlet for discharging stillage, wherein each subsequent first effect evaporator has a stillage inlet in communication with the stillage outlet of the previous first effect evaporator, each of the first effect evaporators having a vapor inlet for receiving heated vapor from a vapor source, each first effect evaporator is configured to cause the heated vapor to heat-exchange with the thin stillage such that water is incrementally evaporated from the thin stillage to produce the first mid stillage and the first effect steam, each first effect evaporator having a first effect steam outlet for releasing the first effect steam; a set of second effect evaporators for evaporating water from the first mid stillage to produce second effect steam and second mid stillage, the second effect evaporators including a first, a second, and a third second effect evaporator connected in series, wherein the first second effect evaporator has a stillage inlet connected to the stillage outlet of the third first effect evaporator and a stillage outlet for discharging stillage, wherein each subsequent second effect evaporator has a stillage inlet in communication with the stillage outlet of the previous second effect evaporator, each of the second effect evaporators having a vapor inlet connected to the first effect steam outlets, each second effect evaporator is configured to cause the first effect steam to heat-exchange with the first mid stillage such that water is incrementally evaporated from the first mid stillage to produce second mid stillage and the second effect steam, each second effect evaporator having a second effect steam outlet for releasing the second effect steam; and a set of third effect evaporators for evaporating water from the second mid stillage to produce third effect steam and syrup, the third effect evaporators including a first, a second, and a third third effect evaporator connected in series, wherein the first third effect evaporator has a stillage inlet connected to the stillage outlet of the third second effect evaporator and a stillage outlet for discharging stillage, wherein each subsequent third effect evaporator has a stillage inlet in communication with the stillage outlet of the previous third effect evaporator, each of the third effect evaporators having a vapor inlet connected to the second effect steam outlets, each third effect evaporator is configured to cause the second effect steam to heat-exchange with the second mid stillage such that water is incrementally evaporated from the second mid stillage to produce the syrup and the third effect steam, each third effect evaporator having a third effect steam outlet for releasing the third effect steam; and a steam line connecting the third effect steam outlets of the third effect evaporators to a vapor inlet of the beer column such that at least a portion of the third effect steam provides heat for operation of the beer column. In embodiments, the system further comprises: a separator configured to separate the thin stillage from the distiller's grains of the beer bottoms; a beer bottoms line connecting the separator and the beer bottoms outlet; and a thin stillage line connecting the separator and the stillage inlet of the first first effect evaporator. In embodiments, the separator is a centrifuge or filter press. In embodiments, the system further comprises a second and a third thin stillage line connected to the first thin stillage line, the stillage inlet of each of the second and third first effect evaporators being in communication with the respective second and third thin stillage lines, whereby the first, second and third first effect evaporators may receive thin stillage from the separator in parallel. In embodiments, pressure in the beer column at the vapor inlet is below atmospheric pressure. In embodiments, the system further comprises: a solvent column having an inlet for receiving a portion of the fermented feed that includes a solvent, the solvent column having a top outlet for discharging a solvent-poor and alcohol-rich vapor and a bottom outlet for a solvent-rich and alcohol-poor liquid, the solvent column being operated in parallel with the beer column; and a second steam line connecting the third effect steam outlets of the third effect evaporators to a vapor inlet of the solvent column such that a portion of the third effect steam provides heat for operation of the solvent column, wherein a pressure in the solvent column at the vapor inlet is below atmospheric pressure. In embodiments, the first effect evaporators have valves for isolating the evaporator and bypass valves associated therewith for redirecting stillage into a line which bypasses the evaporator and reroutes the stillage to the stillage inlet of the next evaporator. In embodiments, the second effect evaporators have valves for isolating the evaporator and bypass valves associated therewith for redirecting stillage into a line which bypasses the evaporator and reroutes the stillage to the stillage inlet of the next evaporator. In embodiments, the third effect evaporators have valves for isolating the evaporator and bypass valves associated therewith for redirecting stillage into a line which bypasses the evaporator and reroutes the stillage to the stillage inlet of the next evaporator. In embodiments, each of the first, second and third effect evaporators have valves for isolating the evaporator and bypass valves associated therewith for redirecting stillage into a line which bypasses the evaporator and reroutes the stillage to the stillage inlet of the next evaporator. In embodiments the top outlet of the beer column discharges a butanol-rich vapor.

Also provided is a system for separating butanol from a fermented feed and concentrating thin stillage into syrup, comprising: a separator configured to separate a fermented feed including butanol and a solvent into a solvent-rich portion and a solvent-poor portion; a beer column fluidly connected to the separator and having an inlet that receives the solvent-poor portion of the fermented feed, the beer column having a top outlet for discharging a butanol-rich vapor and a beer bottom outlet for discharging butanol-poor beer bottoms including distiller's grains and thin stillage, the thin stillage primarily including water; a solvent column fluidly connected to the separator and having an inlet that receives the solvent-rich portion of the fermented feed, the solvent column having a top outlet for discharging a solvent poor and butanol-rich vapor and a bottom outlet for discharging a solvent-rich and butanol-poor liquid; a second separator fluidly connected to the beer bottom outlet of the beer column, wherein the second separator is configured to separate the thin stillage from the distiller's grains of the beer bottoms; a multi-effect evaporation system fluidly connected to the second separator and configured to concentrate the thin stillage into syrup, the multi-effect evaporation system comprising: a set of first effect evaporators for evaporating water from the thin stillage to produce first effect steam and first mid stillage, the first effect evaporators including a first, a second, and a third first effect evaporator connected in series, wherein the first first effect evaporator has a stillage inlet in communication with the beer bottom outlet of the beer column for receiving the thin stillage of the beer bottoms and a stillage outlet for discharging stillage, wherein each subsequent first effect evaporator has a stillage inlet in communication with the stillage outlet of the previous first effect evaporator, each of the first effect evaporators having a vapor inlet for receiving heated vapor from a vapor source, each first effect evaporator is configured to cause the heated vapor to heat-exchange with the thin stillage such that water is incrementally evaporated from the thin stillage to produce the first mid stillage and the first effect steam, each first effect evaporator having a first effect steam outlet for releasing the first effect steam; a set of second effect evaporators for evaporating water from the first mid stillage to produce second effect steam and second mid stillage, the second effect evaporators including a first, a second, and a third second effect evaporator connected in series, wherein the first second effect evaporator has a stillage inlet connected to the stillage outlet of the third first effect evaporator and a stillage outlet for discharging stillage, wherein each subsequent second effect evaporator has a stillage inlet in communication with the stillage outlet of the previous second effect evaporator, each of the second effect evaporators having a vapor inlet connected to the first effect steam outlets, each second effect evaporator is configured to cause the first effect steam to heat-exchange with the first mid stillage such that water is incrementally evaporated from the first mid stillage to produce second mid stillage and the second effect steam, each second effect evaporator having a second effect steam outlet for releasing the second effect steam; and a set of third effect evaporators for evaporating water from the second mid stillage to produce third effect steam and syrup, the third effect evaporators including a first, a second, and a third third effect evaporator connected in series, wherein the first third effect evaporator has a stillage inlet connected to the stillage outlet of the third second effect evaporator and a stillage outlet for discharging stillage, wherein each subsequent third effect evaporator has a stillage inlet in communication with the stillage outlet of the previous third effect evaporator, each of the third effect evaporators having a vapor inlet connected to the second effect steam outlets, each third effect evaporator is configured to cause the second effect steam to heat-exchange with the second mid stillage such that water is incrementally evaporated from the second mid stillage to produce the syrup and the third effect steam, each third effect evaporator having a third effect steam outlet for releasing the third effect steam; a steam line connecting the third effect steam outlets of the third effect evaporators to a vapor inlet of the solvent column such that a portion of the third effect steam provides heat for operation of the solvent column, wherein a pressure in the solvent column at the vapor inlet is below atmospheric pressure; a condenser fluidly connected to the top outlet of the beer column and the top outlet of the solvent column that condenses the butanol-rich and solvent-poor vapors to produce a liquid including butanol; a decanter fluidly connected to the condenser that separates the liquid including butanol to produce a butanol-rich liquid and a butanol-poor liquid; and a distillation column fluidly connected to the decanter that is configured to distill the butanol-rich liquid to produce substantially 100 wt % butanol, the distillation column having a bottom outlet that discharges substantially 100 wt % butanol. In embodiments, the system further comprises a second steam line connecting the third effect steam outlets of the third effect evaporators to a vapor inlet of the beer column such that at least a portion of the third effect steam provides heat for operation of the beer column. In embodiments, the system further comprises a thin stillage line connecting the separator and the stillage inlet of the first first effect evaporator; a second stillage line connected to the first thin stillage line; and a third thin stillage line connected to the first thin stillage line, the stillage inlet of each of the second and third first effect evaporators being in communication with the respective second and third thin stillage lines, whereby the first, second and third first effect evaporators receive thin stillage from the second separator in parallel. In embodiments, the system further comprises a dryer fluidly connected to the second separator and the multi-effect evaporation system, the dryer being configured to the dry distiller's grains of the beer bottoms and the syrup produced by the multi-effect evaporation system to produce feed for livestock. In embodiments, a pressure in the beer column at the vapor inlet is below atmospheric pressure. In embodiments, each of the beer column and the solvent column include a condenser adapted to operate at a pressure that is below atmospheric pressure to thereby maintain the respective beer and solvent columns at a pressure that is below atmospheric pressure. In embodiments, the first effect evaporators have valves for isolating the evaporator and bypass valves associated therewith for redirecting stillage into a line which bypasses the evaporator and reroutes the stillage to the stillage inlet of the next evaporator. In embodiments, the second effect evaporators have valves for isolating the evaporator and bypass valves associated therewith for redirecting stillage into a line which bypasses the evaporator and reroutes the stillage to the stillage inlet of the next evaporator. In embodiments, the third effect evaporators have valves for isolating the evaporator and bypass valves associated therewith for redirecting stillage into a line which bypasses the evaporator and reroutes the stillage to the stillage inlet of the next evaporator.

In embodiments of the systems provided each of the first, second and third effect evaporators have valves for isolating the evaporator and bypass valves associated therewith for redirecting stillage into a line which bypasses the evaporator and reroutes the stillage to the stillage inlet of the next evaporator.

Also provided is a multi-effect evaporation system for concentrating thin stillage into syrup, the thin stillage being obtained as a by-product of separating alcohol from a fermented feed in a beer column, comprising: a set of first effect evaporators for evaporating water from the thin stillage to produce first effect steam and first mid stillage, the first effect evaporators including a first, a second, and a third first effect evaporator connected in series, wherein the first first effect evaporator has a stillage inlet in communication with the beer bottom outlet of the beer column for receiving the thin stillage of the beer bottoms and a stillage outlet for discharging stillage, wherein each subsequent first effect evaporator has a stillage inlet in communication with the stillage outlet of the previous first effect evaporator, each of the first effect evaporators having a vapor inlet for receiving heated vapor from a vapor source, each first effect evaporator is configured to cause the heated vapor to heat-exchange with the thin stillage such that water is incrementally evaporated from the thin stillage to produce the first mid stillage and the first effect steam, each first effect evaporator having a first effect steam outlet for releasing the first effect steam; a set of second effect evaporators for evaporating water from the first mid stillage to produce second effect steam and second mid stillage, the second effect evaporators including a first, a second, and a third second effect evaporator connected in series, wherein the first second effect evaporator has a stillage inlet connected to the stillage outlet of the third first effect evaporator and a stillage outlet for discharging stillage, wherein each subsequent second effect evaporator has a stillage inlet in communication with the stillage outlet of the previous second effect evaporator, each of the second effect evaporators having a vapor inlet connected to the first effect steam outlets, each second effect evaporator is configured to cause the first effect steam to heat-exchange with the first mid stillage such that water is incrementally evaporated from the first mid stillage to produce second mid stillage and the second effect steam, each second effect evaporator having a second effect steam outlet for releasing the second effect steam; and a set of third effect evaporators for evaporating water from the second mid stillage to produce third effect steam and syrup, the third effect evaporators including a first, a second, and a third third effect evaporator connected in series, wherein the first third effect evaporator has a stillage inlet connected to the stillage outlet of the third second effect evaporator and a stillage outlet for discharging stillage, wherein each subsequent third effect evaporator has a stillage inlet in communication with the stillage outlet of the previous third effect evaporator, each of the third effect evaporators having a vapor inlet connected to the second effect steam outlets, each third effect evaporator is configured to cause the second effect steam to heat-exchange with the second mid stillage such that water is incrementally evaporated from the second mid stillage to produce the syrup and the third effect steam, each third effect evaporator having a third effect steam outlet for releasing the third effect steam. In embodiments, the first effect evaporators have valves for isolating the evaporator and bypass valves associated therewith for redirecting stillage into a line which bypasses the evaporator and reroutes the stillage to the stillage inlet of the next evaporator. In embodiments, the second effect evaporators have valves for isolating the evaporator and bypass valves associated therewith for redirecting stillage into a line which bypasses the evaporator and reroutes the stillage to the stillage inlet of the next evaporator. In embodiments, the third effect evaporators have valves for isolating the evaporator and bypass valves associated therewith for redirecting stillage into a line which bypasses the evaporator and reroutes the stillage to the stillage inlet of the next evaporator. In embodiments, each of the first, second and third effect evaporators have valves for isolating the evaporator and bypass valves associated therewith for redirecting stillage into a line which bypasses the evaporator and reroutes the stillage to the stillage inlet of the next evaporator.

Also provided is a system for separating butanol from a fermented feed and concentrating thin stillage into syrup, comprising means for fermenting a mixture including water and milled grain to produce a fermented feed containing butanol; means for contacting at least a portion of the butanol-containing fermentation feed with a water immiscible organic solvent to form a two-phase mixture comprising an aqueous phase and a butanol-containing organic phase; means for separating the butanol-containing organic phase from the aqueous phase; aqueous phase separation means for separating the aqueous phase at a pressure below atmospheric pressure to produce: (i) a butanol-rich vapor and (ii) a butanol-poor beer bottoms including thin stillage, the thin stillage primarily including water, butanol-containing organic phase separation means for separating the butanol-containing organic phase at a pressure below atmospheric pressure to produce a solvent-poor and butanol-rich vapor and a solvent-rich and butanol-poor liquid, the butanol-containing organic phase means being operated in parallel with the aqueous phase separation means; means for evaporating water from the thin stillage to produce first mid stillage and first effect steam, the means for evaporating water from the thin stillage including three first effect evaporators arranged in series; means for evaporating water from the first mid stillage produced with heat from the first effect steam to produce second mid stillage and second effect steam, the means for evaporating water from the first mid stillage including three second effect evaporators arranged in series; means for evaporating water from the second mid stillage produced with heat from the second effect steam to produce a syrup, the means for evaporating water from the second mid stillage including three third effect evaporators arranged in series; means for using a first portion of the third effect steam to supply sufficient heat for separating the aqueous phase in the aqueous phase separation means; and means for using a second portion of the third effect steam to supply sufficient heat for separating the butanol-containing organic phase in the butanol-containing organic phase separation means. In embodiments, the system further comprises means for condensing the butanol-rich vapor produced in the aqueous phase separation means to produce a first butanol-rich liquid; means for condensing the solvent-poor vapor butanol-containing organic phase separation means to produce a solvent-poor liquid; means for combining the first butanol-rich liquid and the solvent-poor liquid to produce a liquid including butanol; means for separating the liquid including butanol to produce a second butanol-rich liquid and a butanol-poor liquid; and means for separating the second butanol-rich liquid to produce a liquid bottom product of substantially 100 wt % butanol. In embodiments, the system further comprises means for isolating and bypassing each of the first, second and third effect evaporators for redirecting stillage into a line which bypasses the evaporator and reroutes the stillage to the stillage inlet of the next evaporator.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION OF THE INVENTION

Figure 1:
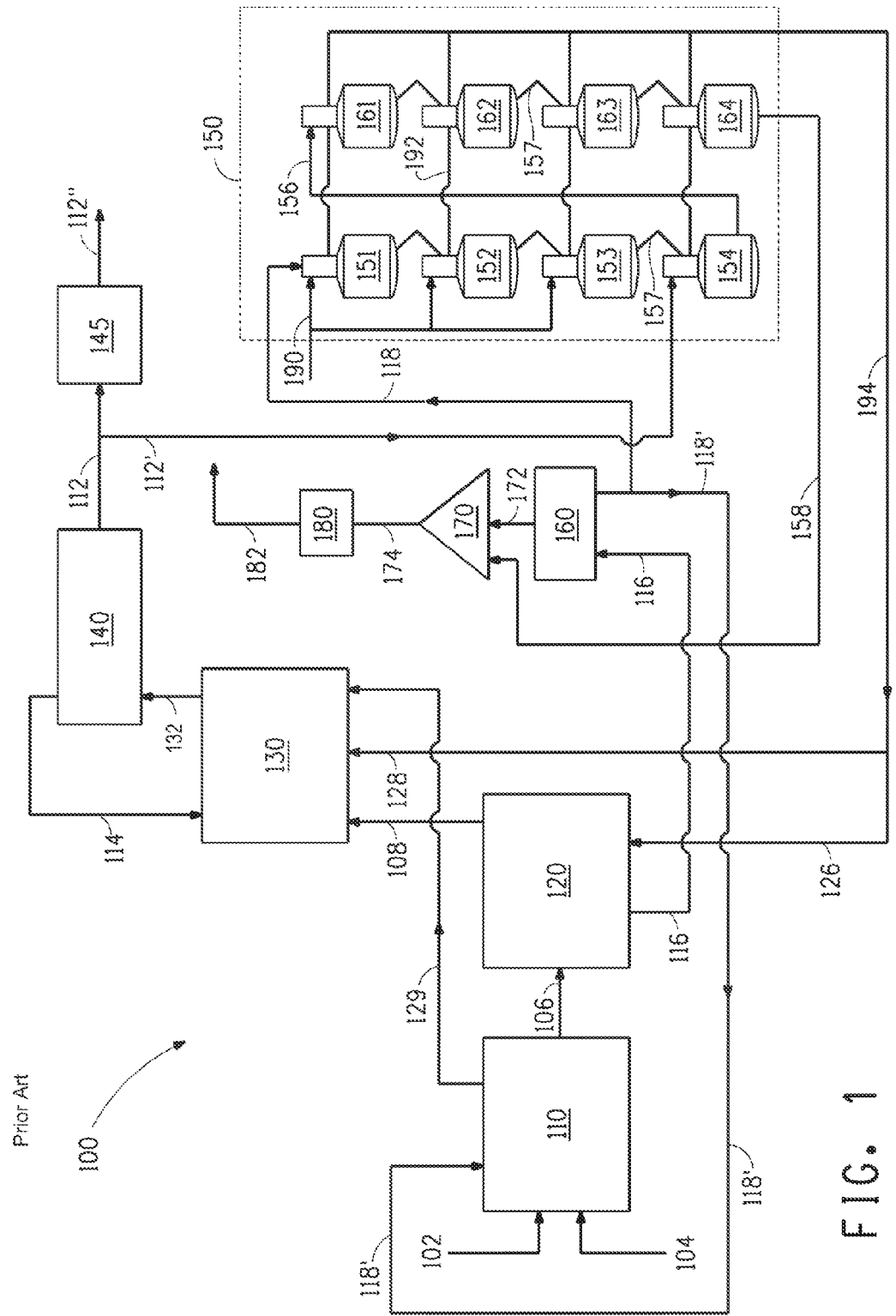
FIG. 1 illustrates a conventional system for production of fuel grade ethanol.

Unless defined otherwise, all technical and scientific terms used herein have the same meaning as commonly understood by one of ordinary skill in the art to which this invention belongs. In case of conflict, the present application including the definitions will control. Also, unless otherwise required by context, singular terms shall include pluralities and plural terms shall include the singular. All publications, patents and other references mentioned herein are incorporated by reference in their entireties for all purposes.

Tables submitted electronically herewith are specifically incorporated by reference in their entireties (including tables 2, 3, 4, 6, 7, 8, 9, 11, 12, 13, and 14).

In order to further define this invention, the following terms and definitions are herein provided.

As used herein, the terms "comprises," "comprising," "includes," "including," "has," "having," "contains" or "containing," or any other variation thereof, will be understood to imply the inclusion of a stated integer or group of integers but not the exclusion of any other integer or group of integers. For example, a composition, a mixture, a process, a method, an article, or an apparatus that comprises a list of elements is not necessarily limited to only those elements but may include other elements not expressly listed or inherent to such composition, mixture, process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

As used herein, the term "consists of," or variations such as "consist of" or "consisting of," as used throughout the specification and claims, indicate the inclusion of any recited integer or group of integers, but that no additional integer or group of integers may be added to the specified method, structure, or composition.

As used herein, the term "consists essentially of," or variations such as "consist essentially of" or "consisting essentially of," as used throughout the specification and claims, indicate the inclusion of any recited integer or group of integers, and the optional inclusion of any recited integer or group of integers that do not materially change the basic or novel properties of the specified method, structure or composition.

Also, the indefinite articles "a" and "an" preceding an element or component of the invention are intended to be nonrestrictive regarding the number of instances, i.e., occurrences of the element or component. Therefore "a" or "an" should be read to include one or at least one, and the singular word form of the element or component also includes the plural unless the number is obviously meant to be singular.

The term "invention" or "present invention" as used herein is a non-limiting term and is not intended to refer to any single embodiment of the particular invention but encompasses all possible embodiments as described in the application.

As used herein, the term "about" modifying the quantity of an ingredient or reactant of the invention employed refers to variation in the numerical quantity that can occur, for example, through typical measuring and liquid handling procedures used for making concentrates or solutions in the real world; through inadvertent error in these procedures; through differences in the manufacture, source, or purity of the ingredients employed to make the compositions or to carry out the methods; and the like. The term "about" also encompasses amounts that differ due to different equilibrium conditions for a composition resulting from a particular initial mixture.

Whether or not modified by the term "about", the claims include equivalents to the quantities. In one embodiment, the term "about" means within 10% of the reported numerical value, preferably within 5% of the reported numerical value.

"Butanol" as used herein refers with specificity to the butanol isomers 1-butanol (1-BuOH) and/or isobutanol (iBuOH or I-BUOH), either individually or as mixtures thereof. 2-Butanol and tert-butanol (1,1-dimethyl ethanol) are specifically excluded from the practice of the present invention.

"Product Removal" as used herein means the selective removal of a specific fermentation product from a biological process such as fermentation to control the product concentration in the biological process.

"Fermentation broth" as used herein means the mixture of water, sugars, dissolved solids, suspended solids, microorganisms producing alcohol, product alcohol and all other constituents of the material held in the fermentation vessel in which product alcohol is being made by the reaction of sugars to alcohol, water and carbon dioxide ($CO_2$) by the microorganisms present. From time to time, as used herein the term "fermentation medium" and "fermented mixture" may be used synonymously with "fermentation broth".

"Fermentation vessel" as used herein means the vessel in which the fermentation reaction by which product butanol is made from sugars is carried out. The term "fermentor" may be used synonymously herein with "fermentation vessel".

The term "effective titer" as used herein, refers to the total amount of a particular alcohol (e.g., butanol) produced by fermentation per liter of fermentation medium. The total amount of butanol includes: (i) the amount of butanol in the fermentation medium; (ii) the amount of butanol recovered from the organic extractant; and (iii) the amount of butanol recovered from the gas phase, if gas stripping is used.

The term "aqueous phase titer" as used herein, refers to the concentration of a particular alcohol (e.g., butanol) in the fermentation broth.

"Stripping" as used herein means the action of transferring all or part of a volatile component from a liquid stream into a gaseous stream.

"Stripping section" as used herein means that part of the contacting device in which the stripping operation takes place.

"Rectifying" as used herein means the action of transferring all or part of a condensable component from a gaseous stream into a liquid stream in order to separate and purify lower boiling point components from higher boiling point components.

"Rectifying section" as used herein means the section of the distillation column above the feed point, i.e. the trays or packing material located above the point in the column where the feed stream enters, where the rectifying operation takes place.

The term "separation" as used herein is synonymous with "recovery" and refers to removing a chemical compound from an initial mixture to obtain the compound in greater purity or at a higher concentration than the purity or concentration of the compound in the initial mixture.

The term "water-immiscible" refers to a chemical component, such as an extractant or solvent, which is incapable of mixing with an aqueous solution, such as a fermentation broth, in such a manner as to form one liquid phase.

The term "extractant" as used herein refers to one or more organic solvents which are used to extract butanol from a fermentation broth. From time to time, as used herein the term "solvent" may be used synonymously with "extractant".

"Fermented feed" as used herein means a fermentation broth generally, and in an embodiment of a process described herein that includes fermentative extraction, "fermented feed" refers to a biphasic mixture obtained by contacting a fermentation broth with a water-immiscible organic extractant.

The term "aqueous phase", as used herein, refers to the aqueous phase of a biphasic mixture obtained by contacting a fermentation broth with a water-immiscible organic extractant. In an embodiment of a process described herein that includes fermentative extraction, the term "fermentation broth" then specifically refers to the aqueous phase in biphasic fermentative extraction, and the terms "solvent-poor portion of a fermented feed" and "solvent-poor phase" may be used synonymously with "aqueous phase" and "fermentation broth".

The term "organic phase", as used herein, refers to the non-aqueous phase of a biphasic mixture obtained by contacting a fermentation broth with a water-immiscible organic extractant. From time to time, as used herein the terms "solvent-rich portion of a fermented feed" and "solvent-rich phase" may be used synonymously with "organic phase".

The term "fatty acid" as used herein refers to a carboxylic acid having a long, aliphatic chain of $C_7$ to $C_{22}$ carbon atoms, which is either saturated or unsaturated.

The term "fatty alcohol" as used herein refers to an alcohol having a long, aliphatic chain of $C_7$ to $C_{22}$ carbon atoms, which is either saturated or unsaturated.

The term "fatty aldehyde" as used herein refers to an aldehyde having a long, aliphatic chain of $C_7$ to $C_{22}$ carbon atoms, which is either saturated or unsaturated.

The term "fatty amide" as used herein refers to an amide having a long, aliphatic chain of $C_{12}$ to $C_{22}$ carbon atoms, which is either saturated or unsaturated.

"Non-condensable gas" means a gas that is not condensed at an operating temperature of the process described herein. Such gases can be selected from gases in the group consisting of, for example, carbon dioxide, nitrogen, hydrogen, Noble gases such as argon, or mixtures of any of these.

Figure 2:
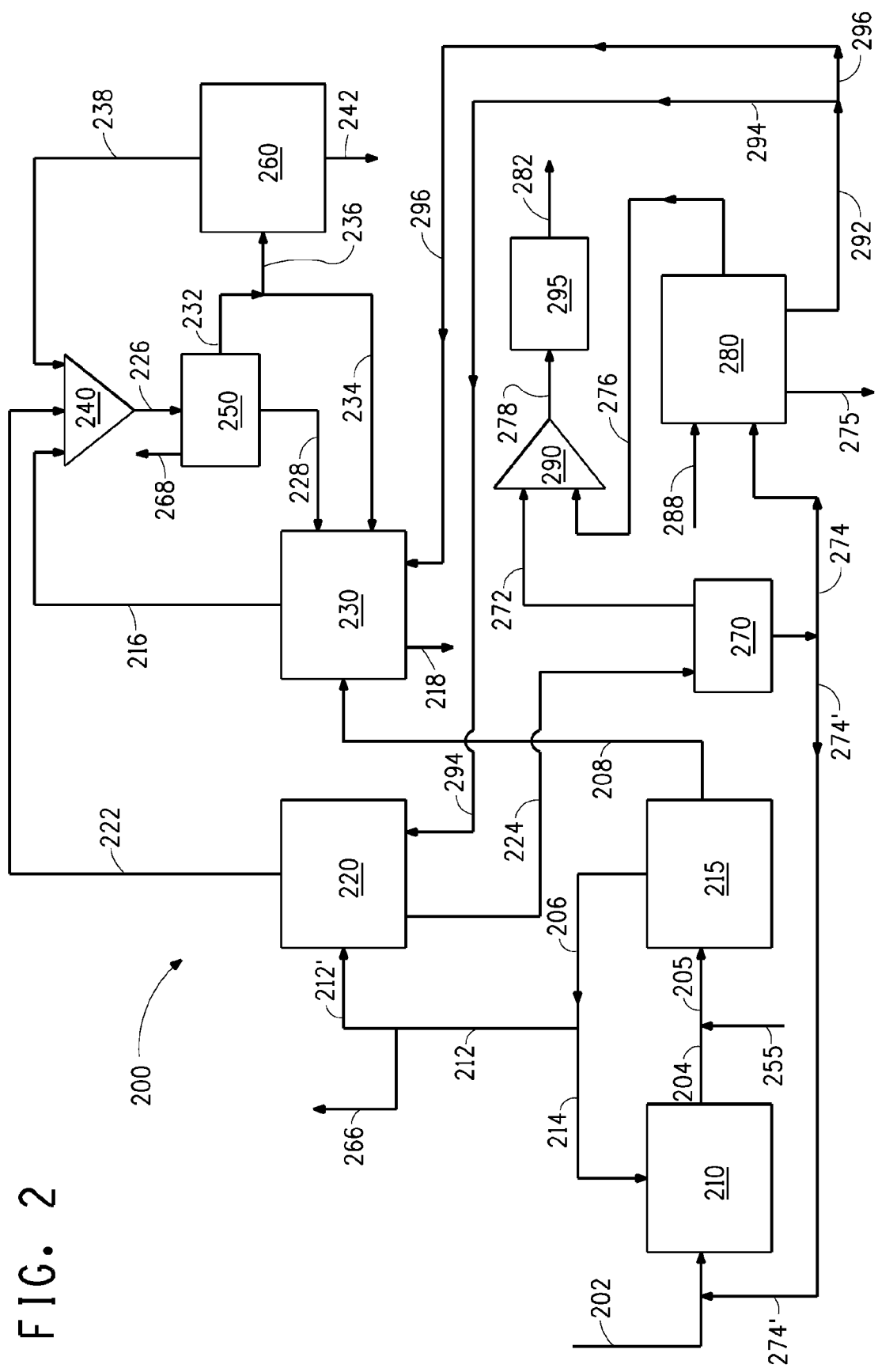
FIG. 2 illustrates a system useful for practicing a process in accordance with an embodiment of the present invention.
Figure 3:
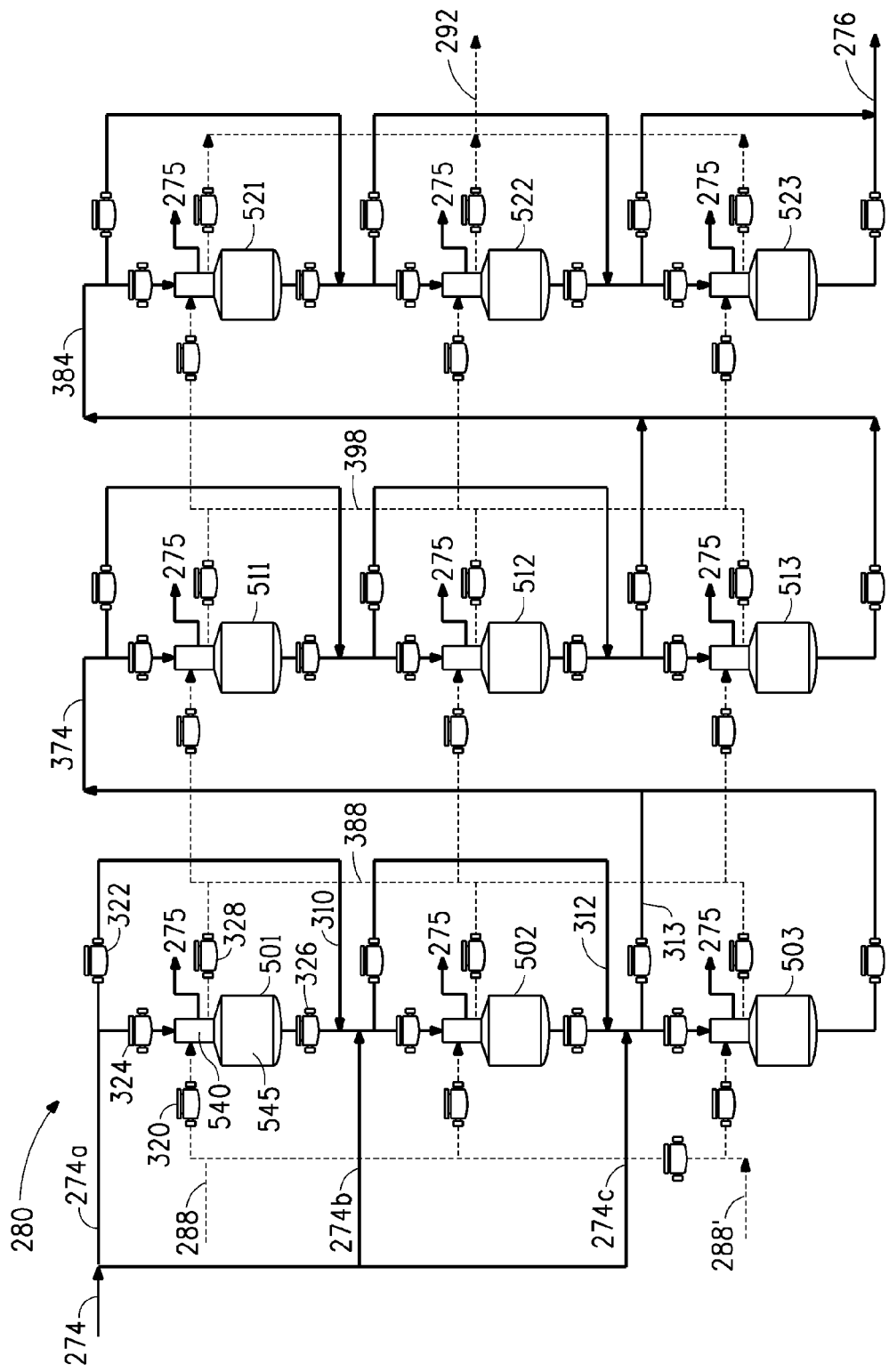
FIG. 3 illustrates a multi-effect evaporator system useful for practicing a process in accordance with an embodiment of the present invention.
Figure 5:
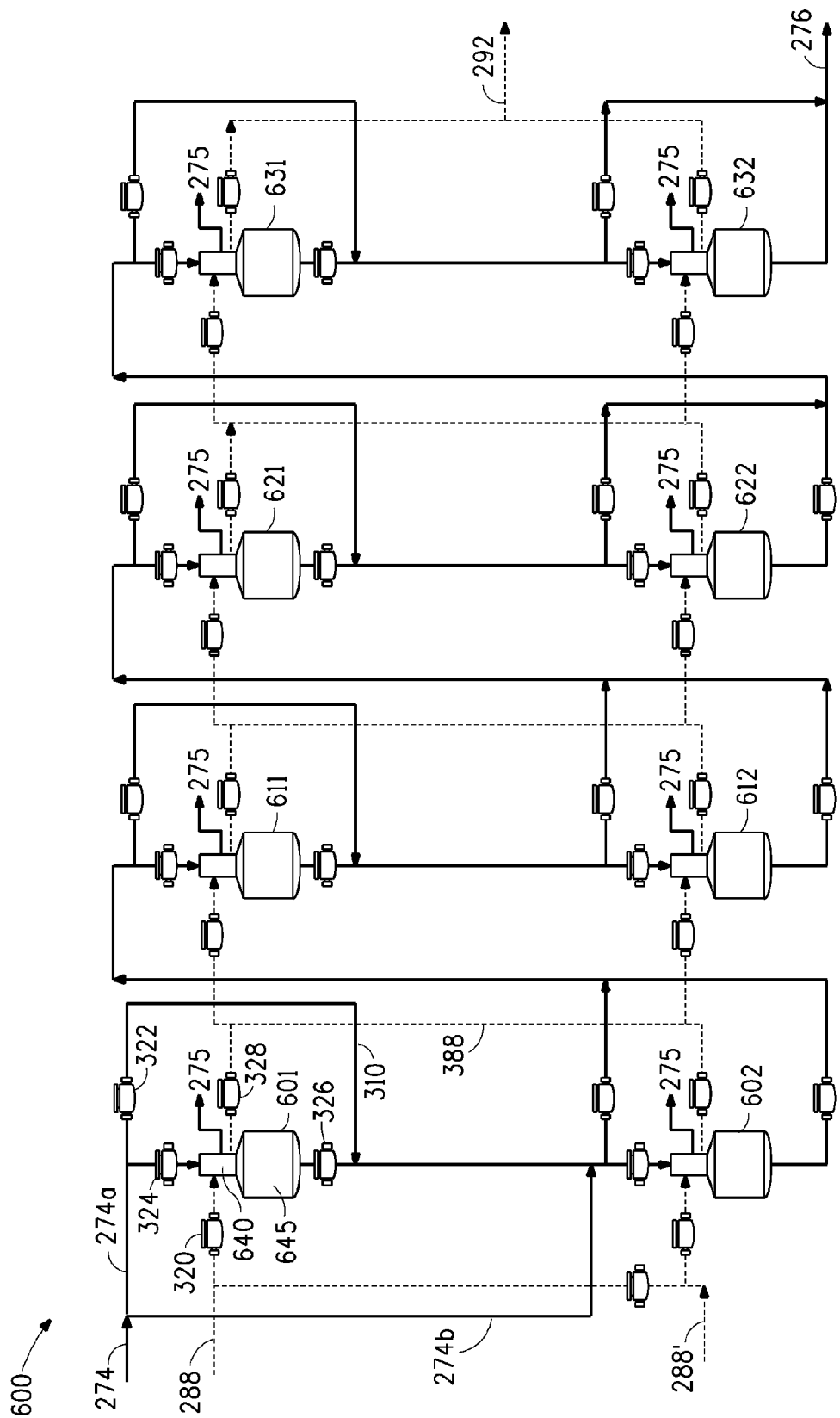
FIG. 5 illustrates a multi-effect evaporator system useful for practicing a process in accordance with an embodiment of the present invention.

The present invention provides systems and methods for recovering alcohol from a fermented feed using distillation, and concentrating the thin stillage by-product into syrup using a triple or, in embodiments, quadruple effect evaporation system. The system and processes of the present invention will be described with reference to FIGS. 2 and 3 as well as FIGS. 5 and 6. FIG. 3 illustrates a three train, triple effect evaporation system 280 in accordance with an embodiment of the present invention. FIG. 2 illustrates an example system 200 for recovering alcohol and concentrating the thin stillage in which the waste heat generated from the example multi-effect evaporation system 280 of FIG. 3 is integrated into the distillation operations for recovering the alcohol. In particular, FIG. 2 illustrates a system for recovering butanol according to an exemplary process that incorporates extractive fermentation and extractant recovery, and yields a product of substantially 100 wt % butanol, in accordance with one embodiment of the present invention. While FIG. 2 is described with reference to an example butanol recovery process, it should be understood that depending on the particular alcohol being recovered, the unit operations and process settings thereof may be varied from the exemplary butanol process of FIG. 2 but such other alcohol recovery systems may still incorporate the multi-effect evaporation system of FIG. 3, 5, or 6 and the heat integrations associated therewith as described herein.

Referring to FIG. 2, a mashed and cooked mixed feed 202 including at least one fermentable carbon source (e.g., milled corn) and water is introduced into a fermentor 210, which contains at least one microorganism (not shown) genetically modified (that is, genetically engineered) to produce butanol via a biosynthetic pathway from at least one fermentable carbon source into butanol. In particular, microorganisms can be grown in fermentation media which contains suitable carbon substrates. Additional carbon substrates may include, but are not limited to, monosaccharides such as fructose, oligosaccharides such as lactose maltose, galactose, or sucrose, polysaccharides such as starch or cellulose or mixtures thereof and unpurified mixtures from renewable feedstocks such as cheese whey permeate, cornsteep liquor, sugar beet molasses, and barley malt. Other carbon substrates may include ethanol, lactate, succinate, or glycerol.

Additionally the carbon substrate may also be one-carbon substrates such as carbon dioxide, or methanol for which metabolic conversion into key biochemical intermediates has been demonstrated. In addition to one and two carbon substrates, methylotrophic organisms are also known to utilize a number of other carbon containing compounds such as methylamine, glucosamine and a variety of amino acids for metabolic activity. For example, methylotrophic yeasts are known to utilize the carbon from methylamine to form trehalose or glycerol (Bellion et al., *Microb. Growth C1 Compd.*, [Int. Symp.], 7th (1993), 415-32, Editor(s): Murrell, J. Collin; Kelly, Don P. Publisher: Intercept, Andover, UK). Similarly, various species of *Candida* will metabolize alanine or oleic acid (Sutter et al., *Arch. Microbiol.* 153:485-489 (1990)). Hence it is contemplated that the source of carbon utilized in the present invention may encompass a wide variety of carbon containing substrates and will only be limited by the choice of organism.

Although it is contemplated that all of the above mentioned carbon substrates and mixtures thereof are suitable in the present invention, in some embodiments, the carbon substrates are glucose, fructose, and sucrose, or mixtures of these with C5 sugars such as xylose and/or arabinose for yeasts cells modified to use C5 sugars. Sucrose may be derived from renewable sugar sources such as sugar cane, sugar beets, cassaya, sweet sorghum, and mixtures thereof. Glucose and dextrose may be derived from renewable grain sources through saccharification of starch based feedstocks including grains such as corn, wheat, rye, barley, oats, and mixtures thereof. In addition, fermentable sugars may be derived from renewable cellulosic or lignocellulosic biomass through processes of pretreatment and saccharification, as described, for example, in U.S. Patent Appl. Pub. No. 20070031918 A1, which is herein incorporated by reference. Biomass refers to any cellulosic or lignocellulosic material and includes materials comprising cellulose, and optionally further comprising hemicellulose, lignin, starch, oligosaccharides and/or monosaccharides. Biomass may also comprise additional components, such as protein and/or lipid. Biomass may be derived from a single source, or biomass can comprise a mixture derived from more than one source; for example, biomass may comprise a mixture of corn cobs and corn stover, or a mixture of grass and leaves. Biomass includes, but is not limited to, bioenergy crops, agricultural residues, municipal solid waste, industrial solid waste, sludge from paper manufacture, yard waste, wood and forestry waste. Examples of biomass include, but are not limited to, corn grain, corn cobs, crop residues such as corn husks, corn stover, grasses, wheat, wheat straw, barley, barley straw, hay, rice straw, switchgrass, waste paper, sugar cane bagasse, sorghum, soy, components obtained from milling of grains, trees, branches, roots, leaves, wood chips, sawdust, shrubs and bushes, vegetables, fruits, flowers, animal manure, and mixtures thereof.

In addition to an appropriate carbon source, fermentation media must contain suitable minerals, salts, cofactors, buffers and other components, known to those skilled in the art, suitable for the growth of the cultures and promotion of an enzymatic pathway.

Genetically modified microorganisms to produce butanol via a biosynthetic pathway can include a member of the genera *Clostridium, Zymomonas, Escherichia, Salmonella, Serratia, Erwinia, Klebsiella, Shigella, Rhodococcus, Pseudomonas, Bacillus, Lactobacillus, Enterococcus, Alcaligenes, Klebsiella, Paenibacillus, Arthrobacter, Corynebacterium, Brevibacterium, Schizosaccharomyces, Kluyveromyces, Yarrowia, Pichia, Candida, Hansenula, Issatchenkia* or *Saccharomyces*. In one embodiment, genetically modified microorganisms can be selected from the group consisting of *Escherichia coli, Lactobacillus plantarum*, and *Saccharomyces cerevisiae*. In one embodiment, the genetically modified microorganism is a crabtree-positive yeast selected from *Saccharomyces, Zygosaccharomyces, Schizosaccharomyces, Dekkera, Torulopsis, Brettanomyces*, and some species of *Candida*. Species of crabtree-positive yeast include, but are not limited to, *Saccharomyces cerevisiae, Saccharomyces kluyveri, Schizosaccharomyces pombe, Saccharomyces bayanus, Saccharomyces mikitae, Saccharomyces paradoxus, Zygosaccharomyces rouxii*, and *Candida glabrata*.

In system 200 of FIG. 2, butanol is recovered from the fermentation medium using a two-phase extractive fermentation method. Methods for producing and recovering butanol from a fermentation broth using extractive fermentation are described in detail in U.S. Patent Publication Application No. 2009/0305370, and U.S. Patent Publication Application No. 2011/0097773, the methods comprising the step of contacting the fermentation broth with a water immiscible organic extractant selected from the group consisting of $C_{12}$ to $C_{22}$ fatty alcohols, $C_{12}$ to $C_{22}$ fatty acids, esters of $C_{12}$ to $C_{22}$ fatty acids, $C_{12}$ to $C_{22}$ fatty aldehydes, $C_{12}$ to $C_{22}$ fatty amides, and mixtures thereof, to form a two-phase mixture comprising an aqueous phase and a butanol-containing organic phase. "Contacting" means the fermentation medium and the organic extractant are brought into physical contact at any time during the fermentation process. Examples of suitable extractants include an extractant comprising at least one solvent selected from the group consisting of oleyl alcohol, behenyl alcohol, cetyl alcohol, lauryl alcohol, myristyl alcohol, stearyl alcohol, oleic acid, lauric acid, myristic acid, stearic acid, methyl myristate, methyl oleate, lauric aldehyde, 1-nonanol, 1-decanol, 1-undecanol, 2-undecanol, 1-nonanal, and mixtures thereof. In one embodiment, the extractant comprises oleyl alcohol. These organic extractants are available commercially from various sources, such as Sigma-Aldrich (St. Louis, Mo.), in various grades, many of which are suitable for use in extractive fermentation to produce or recover butanol. Technical grades contain a mixture of compounds, including the desired component and higher and lower fatty components. For example, one commercially available technical grade oleyl alcohol contains about 65% oleyl alcohol and a mixture of higher and lower fatty alcohols. Additional methods suitable for use with the systems and methods described herein are disclosed in U.S. Patent Application Publication No. 2012/0156738.

Referring to FIG. 2, a fermentation medium 204 is removed from fermentor 210 on a continuous or periodic basis, and an extractant 255 is added to fermentation medium 204 to obtain to a biphasic mixture 205 obtained by contacting the fermentation medium with extractant 255. The biphasic mixture is introduced in a vessel 215, in which separation of the aqueous and organic phases is performed to produce a butanol-containing organic phase 208 and an aqueous phase 206. Extractant 255 is typically a water-immiscible organic solvent or solvent mixture having characteristics which render it useful for the extraction of butanol from a fermentation broth. In one embodiment, extractant 255 comprises at least one solvent selected from the group consisting of $C_7$ to $C_{22}$ fatty alcohols, $C_7$ to $C_{22}$ fatty acids, esters of $C_7$ to $C_{22}$ fatty acids, $C_7$ to $C_{22}$ fatty aldehydes, and mixtures thereof.

The extractant preferentially partitions butanol from the aqueous phase, for example by at least a 1.1:1 concentration ratio, such that the concentration of butanol in the extractant phase is at least 1.1 times that in the aqueous phase when evaluated in a room-temperature extraction of an aqueous solution of butanol. In another embodiment, the extractant preferentially partitions butanol from the aqueous phase by at least a 2:1 concentration ratio, such that the concentration of butanol in the extractant phase is at least two times that in the aqueous phase when evaluated in a room-temperature extraction of an aqueous solution of butanol. The extraction of the butanol product by the organic extractant can be done with or without the removal of the cells from the fermentation medium. The cells can be removed from the fermentation medium by means known in the art including, but not limited to, filtration or centrifugation. Extractant 255 can be added to fermentation medium 204 in a separate vessel (not shown) prior to introduction to vessel 215, or alternatively extractant 255 can be contacted with fermentation medium 204 after introduction into vessel 215 to obtain biphasic mixture 205 which is then separated into the organic and aqueous phases. Butanol-containing organic phase 208 is separated from the aqueous phase 206 of the biphasic fermentation medium using methods known in the art, including but not limited to, siphoning, decantation, centrifugation, using a gravity settler, membrane-assisted phase splitting, and the like.

In system 200 of FIG. 2, butanol is extracted from the fermentation medium downstream of fermentor 210. Alternatively, the two-phase extractive fermentation method can be carried out in situ, in a batch mode or a continuous mode in the fermentor. For in situ extractive fermentation, the organic extractant can contact the fermentation medium at the start of the fermentation forming a biphasic fermentation medium. Alternatively, the organic extractant can contact the fermentation medium after the microorganism has achieved a desired amount of growth, which can be determined by measuring the optical density of the culture. Further, the organic extractant can contact the fermentation medium at a time at which the butanol level in the fermentation medium reaches a preselected level, for example, before the butanol concentration reaches a toxic level. After contacting the fermentation medium with the organic extractant, the butanol product partitions into the organic extractant, decreasing the concentration in the aqueous phase containing the microorganism, thereby limiting the exposure of the production microorganism to the inhibitory butanol product. The volume of the organic extractant to be used depends on a number of factors, including the volume of the fermentation medium, the size of the fermentor, the partition coefficient of the extractant for the butanol product, and the fermentation mode chosen, as described below. The volume of the organic extractant can be about 3% to about 60% of the fermentor working volume.

In a continuous mode of in situ extractive fermentation, in one embodiment, extractant 255 may be introduced into fermentor 210 to obtain the biphasic mixture 205 therein, with the butanol-containing organic-phase stream 208 and aqueous phase stream 206 exiting directly from fermentor 210. In another embodiment, the mixture of the fermentation medium and the butanol-containing organic extractant is removed from the fermentor, and the butanol-containing organic phase is then separated from the aqueous phase. The fermentation medium can be recycled to the fermentor or can be replaced with fresh medium. Then, the extractant is treated to recover the butanol product, and the extractant can then be recycled back into the fermentor for further extraction of the product. Alternatively, fresh extractant can be continuously added to the fermentor to replace the removed extractant. The volume of the organic extractant can be about 3% to about 50% of the fermentor working volume in one embodiment, about 3% to about 30% in another embodiment, 3% to about 20% in another embodiment; and 3% to about 10% in another embodiment. Because the product is continually removed from the reactor, a smaller volume of organic extractant is required enabling a larger volume of the fermentation medium to be used.

In a batchwise mode of in situ extractive fermentation, a volume of organic extractant is added to the fermentor to form a two-phase mixture and the extractant is not removed during the process. This mode requires a larger volume of organic extractant to minimize the concentration of the inhibitory butanol product in the fermentation medium. Consequently, the volume of the fermentation medium is less and the amount of product produced is less than that obtained using the continuous mode. For example, the volume of the organic solvent in the batchwise mode can be 20% to about 60% of the fermentor working volume in one embodiment, and about 30% to about 60% in another embodiment.

Gas stripping (not shown) can be used concurrently with the organic extractant to remove the butanol product from the fermentation medium. Gas stripping can be done by passing a gas such as air, nitrogen, or carbon dioxide through the fermentation medium, thereby forming a butanol-containing gas phase. The butanol product can be recovered from the butanol-containing gas phase using methods known in the art, such as using a chilled water trap to condense the butanol, or scrubbing the gas phase with a solvent. Methods for controlling butanol concentration in a fermentation using gas stripping are described in detail in copending and commonly owned International Application Publication No. WO 2009/079362, filed on Dec. 12, 2008.

Depending on the efficiency of the extraction, the aqueous phase titer of butanol in the fermentation medium can be, for example, from about 5 g/L to about 85 g/L, from about 10 g/L to about 40 g/L, from about 10 g/L to about 20 g/L, from about 15 g/L to about 50 g/L or from about 20 g/L to about 60 g/L. Without being held to theory, it is believed that higher butanol titer may obtained with the extractive fermentation method, in part, from the removal of the toxic butanol product from the fermentation medium, thereby keeping the level below that which is toxic to the microorganism.

Isobutanol can be produced by extractive fermentation with the use of a modified *Escherichia coli* or *Saccharomyces cerevisiae* strain, for example, in combination with oleyl alcohol as the organic extractant to achieve an effective titer of greater than 22 g per liter of the fermentation medium in one embodiment, of at least 25 g per liter of the fermentation medium in another embodiment, of at least 30 g per liter of the fermentation medium in another embodiment, of at least 32 g per liter of the fermentation medium in another embodiment, of at least 35 g per liter of the fermentation medium in another embodiment, of at least 37 g per liter of the fermentation medium in another embodiment, and of at least 40 g per liter of the fermentation medium in another embodiment. The use of oleyl alcohol as the extractant in combination with gas stripping can provide significantly higher titers than gas stripping alone, even though gas stripping alone is effective in keeping the butanol below toxic levels. Organic extractants comprising or consisting essentially of oleyl alcohol can also provide improved titers.

After separation of the fermentation medium from the extractant by means described above, the fermentation medium can be recycled into the fermentor, discarded, or treated for the removal of any remaining butanol product. In the embodiment of FIG. 2, after separation of the fermentation medium from the extractant, the aqueous phase 206 is split into a feed stream 212 and a recycle stream 214. Recycle stream 214 returns a portion of the fermentation medium to fermentor 210. Similarly, if cells were removed from the fermentation medium prior to contact with the organic extractant, the isolated cells (not shown) can also be recycled into the fermentor. Feed stream 212 of the fermentation medium can be degassed to remove at least a portion of non-condensable gases 266 therefrom, and the degassed feed stream 212' is introduced into a beer distillation column 220 for recovery of any remaining butanol product, as will be described in further detail below. The removed non-condensible gases 266 can be sent to a scrubber (not shown).

After extracting the butanol from the fermentation medium, the butanol is recovered from butanol-containing organic phase 208. Butanol-containing organic phase 208 typically comprises the water-immiscible organic extractant, water, the butanol, and optionally a non-condensable gas. Butanol-containing organic phase 208 can optionally further comprise fermentation by-products having sufficient solubility to partition into the extractant phase. In one embodiment, butanol-containing organic phase 208 has a butanol concentration in the feed from about 0.1 weight percent to about 50 weight percent, for example about 0.1 weight percent to about 40 weight percent, for example from about 1 weight percent to about 40 weight percent, for example from about 2 weight percent to about 40 weight percent, for example from about 5 weight percent to about 35 weight percent, for example about 10 weight percent to about 35 weight percent based on the weight of phase 208.

Recovery of the butanol from the butanol-containing organic phase can be done using methods known in the art, including but not limited to, distillation, adsorption by resins, separation by molecular sieves, pervaporation, and the like. The exemplary system of FIG. 2 incorporates a combination of distillation and decantation to recover the butanol from butanol-containing organic phase 208. Methods for separating or recovering butanol from a feed comprising a water-immiscible organic extractant, water, the butanol, and optionally a non-condensable gas using a combination of distillation and decantation are described in detail in copending and commonly owned U.S. Patent Application Publication No. 2011/0162954, and can be used in the system and methods of the present invention. To recover butanol from the extractant by distillation, it is preferred that the extractant has a boiling point at atmospheric pressure which is at least about 30 degrees Celsius higher than that of the butanol to be recovered, for example at least about 35 degrees Celsius higher, for example at least about 40 degrees higher, for example at least about 45 degrees Celsius higher, for example at least about 50 degrees Celsius higher, for example at least about 55 degrees higher, or for example at least about 60 degrees Celsius higher.

In the embodiment shown in FIG. 2, the distillation to recover the butanol from the butanol-containing organic phase 208 involves the use of at least two distillation columns: a solvent column 230 and a butanol column 260. Solvent column 230, in combination with decantation, effects a separation of any non-condensable gas, such as carbon dioxide, and butanol from the extractant, for example oleyl alcohol, and water.

In particular, butanol-containing organic phase 208 is distilled in solvent column 230 to provide a butanol-rich vaporous overhead stream 216 comprising water, butanol, and non-condensable gas if present in the feed, and a solvent-rich liquid bottoms stream 218 comprising the extractant and water and being substantially free of butanol. By "substantially free of butanol" it is meant that butanol comprises no more than about 0.01 wt % of the bottoms 218. Although not shown, recovered extractant stream 218 can be recycled to the extractive fermentation process. For example, recovered extractant stream 218 can be used as the extractant 255 that is contacted with fermenation medium 204.

Vaporous overhead stream 216 can include up to about 65 wt % butanol and at minimum about 30 wt % water. In one embodiment, vaporous overhead stream includes from about 65 wt % butanol and at minimum about 32 wt % water, from about 60 wt % butanol and at minimum about 35 wt % water in another embodiment, from about 55 wt % butanol and at minimum about 40 wt % water in another embodiment, and from about 50 wt % to about 55 wt % butanol and from about 45 wt % to about 50 wt % water in other embodiment. In one embodiment, the amount of extractant in vaporous overhead stream 216 is less than 2 wt %. Vaporous overhead stream 216 can be cooled and condensed in a condenser (not shown) and combined in a mixer 240 with condensed vaporous overhead streams 222 and 238 from beer column 220 and butanol column 260, respectively. The combined stream 226 is decanted in a decanter 250 into a butanol-rich liquid phase and a butanol-poor liquid aqueous phase. For example, the liquid butanol phase (which is the lighter liquid phase) can include less than about 30 wt % water, or from about 20 to about 30 wt % water, or from about 16 to about 30 wt % water, or from about 10 to about 20 wt % water, and can further comprise less than about 0.001 weight percent of residual extractant which comes overhead in solvent column 230. The residual extractant in the butanol-rich liquid phase can be minimized by use of a rectification section in column 230. The liquid aqueous phase can include less than about 10 wt % butanol, or in one embodiment, from about 3 to about 10 wt % butanol. If a non-condensable gas is present in stream 216 from solvent column 230, at least a portion of the non-condensable gas can be purged from the process, which is shown as stream 268 leaving decanter 250. The purged gas can be sent to a scrubber (not shown) and the scrubber water (not shown) returned to decanter 250 for recovery of any butanol therein. This is preferred to recycling the scrubber water to the fermentation portion of the process, because of butanol's toxicity to the butanol-producing microorganisms in the fermentation medium. The decanter can be of any conventional design.

All or part of the liquid aqueous phase from decanter 250 can be returned to solvent column 230 as a reflux stream 228. A stream 232 of the butanol-rich liquid phase from decanter 250 can be split, with a portion returned to solvent column 230 as a reflux stream 234 and the remainder portion 236 fed to butanol column 260. Butanol column 260 effects a separation of butanol and water and provides a butanol bottoms stream 242 which is substantially 100 wt % butanol and substantially free of water. By "substantially 100 wt % butanol" and "substantially free of water" it is meant that less than about 0.01 wt % of water and/or other non-butanol component (e.g., the extractant) is present in bottoms stream 242. Vaporous overhead stream 238 comprises butanol and water, for example about 67 wt % butanol and about 33 wt % water, for example 60 wt % butanol and about 40 wt % water, or for example 55 wt % butanol and about 45 wt % water. Vaporous overhead stream 238 can be condensed in a condenser (not shown) and return to decanter 226 via mixer 240.

Solvent column 230 can be any conventional distillation column having at least a feed inlet, an overhead vapor outlet, a bottoms stream outlet, a heating means, and a sufficient number of stages to effect the separation of the butanol from the extractant. For example, in one embodiment where the extractant comprises oleyl alcohol, solvent column 230 can have at least 5 stages and can include a re-boiler. In one embodiment, solvent column 230 has 15 stages. A rectification section may be required when minimum extractant loss in stream 236 is desired and may or may not be combined with use of reflux stream 234. The heating means can be a heated vapor such as steam that is supplied to the column at a vapor inlet. In one embodiment, the vapor inlet is at the bottom of column 230 and the overhead vapor outlet is at the top of column 230. In one embodiment, solvent column 230 is maintained at a pressure below atmospheric pressure (achieved, for example, by below atmospheric pressure operation of the condenser (not shown) for condensing overhead vapor 116). In this instance, the pressure in solvent column 230 at the vapor inlet is below atmospheric pressure. The heated vapor supplied thereto should have a pressure corresponding to the column pressure at the vapor inlet. In one embodiment, the pressure at the vapor inlet is about 8.4 psia (about 0.57 atm), and in one embodiment the pressure at the vapor outlet is about 7 psia (about 0.47 atm). In one embodiment, the pressure at the vapor inlet is about 14.0 psia, and in one embodiment the pressure at the vapor outlet is about 12.5 psia. In one embodiment, the pressure at the vapor inlet is about 11.0 psia, and in one embodiment the pressure at the vapor outlet is about 9 psia. In one embodiment, the pressure at the vapor inlet is about 9.0 psia, and in one embodiment the pressure at the vapor outlet is about 7 psia. In one embodiment, the pressure at the vapor inlet is about 8 psia, and in one embodiment the pressure at the vapor outlet is about 6.5 psia. In one embodiment, a pressure drop in solvent column 230 is maintained from about 1.5 psia to about 2.0 psia, from about 2.0 psia to about 2.5 psia in another embodiment, and from about 1.0 psia to about 2.5 psia in another embodiment.

Butanol column 260 can be any conventional distillation column having at least a feed inlet, an overhead vapor outlet, a bottoms stream outlet, a heating means (e.g., heated vapor), and a sufficient number of stages to effect the desired separation so as to provide bottoms stream 242 substantially free of water. For example, in one embodiment, butanol column 260 can have at least 6 stages and can include a re-boiler. In one embodiment, butanol column 260 has 10 stages, and in one embodiment, butanol column 260 is maintained at a pressure below atmospheric pressure. In one embodiment, butanol column 260 is maintained at a pressure above atmospheric pressure, and overhead vapor of 260 can be sent to single first effect body 503 as heating medium and condensate returns to decanter 250.

After separation of the fermentation medium from the extractant, the degassed aqueous phase feed stream 212' is introduced into beer column 220 to provide a butanol-rich vaporous overhead stream 222 comprising water, butanol, and non-condensable gas if present in the feed, and a butanol-poor beer bottoms liquid stream 224. Beer bottoms stream 224 comprises by-products such as distiller's grains and thin stillage. Vaporous overhead stream 222 can be condensed in a condenser (not shown) and introduced in decanter 250 for recovery of the butanol using butanol column 260, as described above. Thus, beer column 220 is operated in parallel with solvent column 230, and condensed vaporous overhead stream 222 from beer column 220 can be mixed with condensed vaporous overhead stream 216 from solvent column 230 in mixer 240, and the combined stream 226 decanted in decanter 250.

In an embodiment not depicted, the fermentation medium is not separated from the extractant prior to distillation to recover the butanol. In such an embodiment, the two-phase mixture is distilled in the beer column which is operated to effect a separation of butanol from the extractant and water.

Beer column 220 can be any conventional distillation column having at least a feed inlet, an overhead vapor outlet, a bottoms stream outlet, a heating means (e.g., heated vapor), and a sufficient number of stages to effect the separation of the butanol from the beer bottoms. For example, in one embodiment, beer column 220 can have at least 10 stages and can include a re-boiler. In one embodiment, beer column 220 is maintained at a pressure below atmospheric pressure. In one embodiment, a pressure drop in beer column 220 is maintained from about 1.5 psia to about 2.0 psia from about 2.0 psia to about 2.5 psia in another embodiment, and from about 1.0 psia to about 2.5 psia in another embodiment. In one embodiment, a pressure in beer column 220 at a vapor inlet is below atmospheric pressure. In one embodiment, the vapor inlet is at the bottom of column 220 and the overhead vapor outlet is at the top of column 220, as shown. In one embodiment, the pressure at the vapor inlet is about 8.4 psia (about 0.57 atm), and heated vapor at pressure of about 8.4 psia (about 0.57 atm) is supplied to the column at the vapor inlet. In one embodiment the pressure at the vapor outlet is about 7 psia (about 0.47 atm). In one embodiment, the pressure at the vapor inlet is about 14.0 psia, and in one embodiment the pressure at the vapor outlet is about 12.5 psia. In one embodiment, the pressure at the vapor inlet is about 11.0 psia, and in one embodiment the pressure at the vapor outlet is about 9 psia. In one embodiment, the pressure at the vapor inlet is about 9.0 psia, and in one embodiment the pressure at the vapor outlet is about 7 psia. In one embodiment, the pressure at the vapor inlet is about 8 psia, and in one embodiment the pressure at the vapor outlet is about 6.5 psia.

Since the beer bottom by-products have value as feedstock, it is usually desirable to further process all or part of these by-products into one or more of Distiller's Dried Grains, Distillers Wet Grains, Distillers Dried Solubles, Condensed Distillers Solubles, and/or Distiller's Dried Grains with Solubles (DDGS), rather than discarding the beer bottoms as waste. In the embodiment of FIG. 2, beer bottoms stream 224 is further processed to produce DDGS 282. To that end, beer bottoms stream 224 is introduced into a separator 270, which can be a mechanical separator such as a centrifuge or filter press, for separating the grain solids 272 of the beer bottoms from thin stillage which primarily includes water. A portion 274' of the thin stillage can be recycled to the mixed feed 202 introduced into fermentor 210. The remainder thin stillage 274 is concentrated into a syrup 276 by evaporating a substantial amount of water therefrom in multi-effect evaporation system 280. In one embodiment, multi-effect evaporation system 280 achieves evaporation of the water from thin stillage 274 such that the weight concentration of water in syrup 276 is about half the weight concentration of water in thin stillage 274. In one embodiment, multi-effect evaporation system 280 achieves evaporation of the water from thin stillage 274 such that the weight concentration of water in syrup 276 is from about 40% to about 65%, and in another embodiment the weight concentration water in syrup 276 is from about 45% to about 60%. In one embodiment, the weight concentration of water in thin stillage 274 is from about 85% to about 95%, and in another embodiment the weight concentration of water in thin stillage 274 is about 90%. Syrup 276 can then be combined with grain solids 272 in a mixer 290, and the combined stream 278 of grains and syrup can then be dried in a dryer 295 to produce DDGS 282.

In an embodiment not depicted in FIG. 2, the two-phase mixture is distilled in the beer column which is operated to effect a separation of butanol from the extractant and water. The beer bottom by-product is processed as described above into one or more of Distiller's Dried Grains, Distillers Wet Grains, Distillers Dried Solubles, Condensed Distillers Solubles, and/or Distiller's Dried Grains with Solubles (DDGS), and the thin stillage comprises extractant. A portion of the thin stillage comprising extractant may be recycled to the fermentor as described above, and the remainder is concentrated into a syrup by evaporating a substantial amount of water therefrom as described above in multi-effect evaporation systems described herein.

In multi-effect evaporation system 280, clean plant steam 288 and/or plant reused steam 288' (see FIG. 3) is used as a heat source to effect evaporation of water from the thin stillage to produce mid stillage. The resulting steam constituted by the evaporated water from the thin stillage can then be used in the evaporators of subsequent effects to incrementally evaporate water from the mid stillage to produce syrup 276. Steam constituted by the evaporated water from the mid stillage is collected and discharged via steam line 292 and integrated into system 200 as the heating means for beer column 220 and/or solvent column 230, for example, or as the heating means of other unit operations, such as for butanol column 260. For example, in one embodiment, third effect steam can be used in lieu of a reboiler for butanol column 260. In such a case, the steam injected can be condensed and decanted in the decanter 250, although this can increase the hydraulic load in the distillation operations. In the embodiment of FIG. 2, steam line 292 is split into lines 294 and 296 which feed steam to beer column 220 and solvent column 230 to provide heat for the separation operations of these columns. Steam condensate from the evaporators is discharged through a condensate line 275 and can be recycled to other unit operations in system 200 as needed or fed back to the plant steam boilers (not shown). In one embodiment, condensate stream 275 is heated and recycled (not shown) for use at the fermentation portion of the process, e.g., to be mixed with the milled grains to form mixed feed 202 that is introduced into fermentor 210.

Multi-effect evaporation system 280 will now be described with reference to FIG. 3. Multi-effect evaporation system 280 is formed of three train, triple effect evaporators (9 total evaporators) to concentrate thin stillage 274 from separator 270 to syrup 276, which can then be fed to dryer 295, as described above. The first effect evaporators are evaporators 501, 502 and 503. The second effect evaporators are evaporators 511, 512 and 513. The third, or last, effect evaporators are evaporators 521, 522 and 523. The evaporators of each effect can be of any conventional design. For example, as shown for first effect evaporator 501, each evaporator can include an upper portion 540 having a shell tube heat exchanger as known in the art, and a lower pot portion 545. In upper portion 540, tubes convey stillage from an inlet situated above the heat exchanger (e.g., proximate valve 324), through the heat exchanger portion and then to pot portion 545 below. The stillage is discharged through an outlet (e.g., proximate valve 326) that is in communication with the stillage inlet of the subsequent evaporator (e.g., evaporator 502). A heated vapor from a vapor source is received at a vapor inlet (e.g., proximate valve 320) and is isolated in the shell side of the heat exchanger as known in the art. The heat exchange between the heated vapor and the stillage causes water from the stillage to evaporate, and the steam to condense, which exits at condensate line 275. Condensate from each evaporator can be combined and recycled in system 200 (see line 275 in FIG. 2). The evaporated water from the stillage can be released at a steam outlet (e.g., proximate valve 328) which can be connected to vapor inlets of downstream effects of evaporation system 280. The various lines leading to the evaporators are valved so that any one of the evaporators can be taken off-line and by-passed for maintenance.

In the embodiment shown, the vapor inlets of first effect evaporators 501, 502 and 503 receive clean plant steam 288 and/or reused plant steam 288' as a heat source. Thin stillage 274 enters upper portion 540 of evaporator 501 via line 274a and leaves bottom pot portion 545 of evaporator 501 slightly concentrated. Optionally, thin stillage 274 entering evaporation system 280 can be divided, equally or otherwise, among the three first effect evaporators 501, 502 and 503 in parallel, via respective lines 274a, 274b and 274c connected to the stillage inlets of these evaporators. Concentrated stillage leaving evaporator 501 can enter the top of the next evaporator 502 and then finally exits the bottom of the last first effect evaporator 503 as first mid stillage in a first mid stillage line 374. Steam that is boiled off from the thin stillage in evaporators 501, 502 and 503 is released through respective steam outlets as first effect steam and enters a first effect steam line 388. In embodiments, the plant reused steam 288' comprises process vapors from other plant operations that need to be condensed. In such embodiments, the first effect evaporator bodies receiving the vapors may serve as condensers of those process vapors, and the shellside of the evaporator bodies would be isolated so that condensed process liquid could return to other processes without contamination of clean steam condensates which may go to the recycle water tank. In one example, the plant reused steam 288' comprises the vaporous overhead from the butanol column 260 which may be condensed in the first effect evaporator bodies and may be decanted in decanter 250.

In one embodiment, first effect evaporators 501, 502 and 503 are each operated at a pressure of about 20 psia and at a temperature of from about 105° C. to about 115° C., in another embodiment from about 105° C. to about 110° C., and in another embodiment about 109° C. Plant steam can be at higher temperature and pressure than the operation temperature and pressure of the first effect evaporators so that a temperature approach is maintained between the stillage and the heating steam. In one embodiment, the temperature approach is from about 10° C. to about 20° C. embodiment, and in another embodiment the temperature approach is about 10° C. The temperature and pressure of the first effect evaporators can be either slightly higher or lower than the above-stated temperature and pressure ranges. For example, in one embodiment, the first effect temperatures can be from about 99° C. to about 130° C. Lowering the first effect temperature lowers the third effect temperature. Therefore, in general, the first effect evaporator temperature should be within a workable range that guarantees a temperature and pressure for the third effect steam for heating the one or more of the distillation columns (e.g., the beer column 220 and the solvent column 230) of the particular alcohol recovery process. This will increase the vacuum required for operation of the distillation column(s) using the third effect steam. A deep vacuum pressure for distillation may make it more difficult to condense the overhead vapor stream of the column (absent re-pressurization) if non-condensable gases are present in the stream. An optimal temperature is one which is not too high so as to reduce or prevent fouling on the stillage side of the evaporators and still guarantees that useful third effect steam is produced.

In one embodiment, the first effect steam generated by the first effect evaporators is at a pressure of from about 14 psia to about 38 psia (corresponding to a temperature of about 99° C. to about 130° C.), and at a pressure of from about 16 psia to about 30 psia. In another embodiment, the first effect steam is at a pressure of about 20 psia and at a temperature of about 109° C. The first effect steam generated by first effect evaporators 501, 502 and 503 is combined (at line 388) and then distributed, equally or otherwise, to second effect evaporators 511, 512 and 513. First effect steam line 388 supplies first effect steam to the vapor inlets of second effect evaporators 511, 512 and 513. Alternatively, the first effect steam from each first effect evaporator can supply the respective second effect evaporators. For example, steam generated in first effect evaporator 501 is supplied to second effect evaporator 511.

The arrangement and operation of second effect evaporators 511, 512 and 513 and third effect evaporators 521, 522 and 523 is much like the first effect evaporators 501, 502 and 503, except that the second and third effect evaporators operate at a lower pressure and temperature, the second effect evaporators are heated by first effect steam collected from first effect evaporators 501, 502 and 503, and the third effect evaporators are heated by second effect steam collected from second effect evaporators 511, 512, and 513. In one embodiment, the pressure drop for the evaporators in each effect is from about 4.0 psi to about 7.0 psi. In one embodiment, the pressure drop is lower for a subsequent effect than for the preceding effect. For example, for the particular embodiment where 20 psia first effect pressure is used, the pressure drop for the first effect evaporators is about 6.1 psia and for the second effect evaporators is about 4.6 psia. In general, the overall pressure drop across the evaporators depends on the temperature approach between the evaporator effects. For example the pressure drop across the evaporators is based on a 10° C. approach between adjacent effects, for the particular embodiment where 20 psia first effect pressure is used and third effect steam generated is at a pressure of about 9.3 psi.

The first mid stillage enters the top of second effect evaporator 511 and leaves the bottom of evaporator 511 more concentrated. Concentrated stillage leaving evaporator 511 can enter the top of the next second effect evaporator 512 and then finally exits the bottom of the last second effect evaporator 513 as second mid stillage in a second mid stillage line 384. Steam that is boiled off from the first mid stillage in evaporators 511, 512 and 513 is released through respective steam outlets as second effect steam and enters a second effect steam line 398. Second effect steam generated by second effect evaporators can be combined (at line 398) and then distributed, equally or otherwise, to the third effect evaporators. Second effect steam line 398 supplies second effect steam to the vapor inlets of third effect evaporators 521, 522 and 523. Alternatively, each second effect evaporator can supply second effect steam to only the respective third effect evaporators in the evaporation train. In one embodiment, the second effect steam generated by the second effect evaporators is at a pressure of from about 10 psia to about 16 psia, and at a temperature of from about 90° C. to about 106° C. In another embodiment, the second effect steam is at a pressure of about 13.85 psia and at a temperature of about 99° C.

The second mid stillage enters the top of third effect evaporator 521 and leaves the bottom of evaporator 521 more concentrated. Concentrated stillage leaving evaporator 521 can enter the top of the next third effect evaporator 522 and then finally exits the bottom of the last third effect evaporator 523 as syrup 276 which can be conveyed to mixer 290 to form combined grains and syrup stream 278 that is dried to produce DDGS 282. Steam that is boiled off from the second mid stillage in evaporators 521, 522 and 523 is released through respective steam outlets as third effect steam and enters steam line 292 which splits into steams lines 294 and 296 that convey the third effect steam to beer column 220 and solvent column 230, respectively. In one embodiment, the third effect steam generated by the third effect evaporators is at a pressure of from about 7 psia to about 12 psia, and at a temperature of from about 80° C. to about 95° C., and in another embodiment the third effect steam is at a temperature of from about 85° C. to about 90° C. In another embodiment, the third effect steam is at a pressure of about 9.3 psia and at a temperature of about 88° C.

In one embodiment, the third effect steam supplies sufficient heat for distilling the fermented feed 212' in the beer column 220. In one embodiment, the third effect steam supplies sufficient heat for distilling the butanol-containing organic phase 208 in the solvent column 230. In one embodiment, plant steam is used along with the third effect steam to supply sufficient heat for distilling the fermented feed 212' in the beer column 220. In one embodiment, plant steam is used along with the third effect steam to supply sufficient heat for distilling the butanol-containing organic phase 208 in the solvent column 230. In another embodiment, only the beer column 220 is supplied with third effect steam. In another embodiment, only the solvent column 230 is supplied with third effect steam. For other embodiments of butanol recovery processes, such as a recovery process utilizing technologies for in situ product removal other than or in addition to liquid-liquid extraction (e.g., stripping, adsorption, pervaporation, membrane solvent extraction), as well as for recovery processes pertaining to other alcohols, the third effect steam from the multi-effect evaporation system described herein can be used to supply heat to one or more distillation unit operations of the process. The one or more distillation unit operations receiving heat from the third effect steam should be maintained at a pressure below atmospheric pressure, thereby avoiding having to pressurize the third effect steam prior to injection into the particular distillation column.

The three train, triple effect evaporators of the present invention can provide the advantage over a two effect evaporation system by efficiently using the second effect steam to obtain a higher concentrated syrup, or alternatively to obtain a syrup of the same concentration as with a two effect evaporation system but allowing higher throughputs of stillage. A more dilute syrup may be desirable to process because a dilute syrup can reduce the possibility of equipment fouling and may require less force to convey. A concentrated syrup also offers advantages, and can offer a more energy efficient process than with a dilute syrup, because less water in the concentrated syrup lowers the heat duty of the downstream DDGS dryer (e.g. dryer 295). The three train, triple effect evaporators of the present invention can also provide the advantage of efficiently using the steam of the evaporation system by obtaining steam from the last effect that has an optimal temperature and pressure for direct feed to the beer column 220 and solvent column 230 without additional preheating or cooling and/or pressurization steps. Moreover, for butanol production in particular, the beer, solvent and butanol distillation columns are arranged in such a way that third effect steam can be used while still keeping the first effect evaporator temperature relatively low, so that only small numbers of evaporator cleanings each year should be required during production operations. In particular, because beer column 220 and solvent column 230 are arranged in parallel, and can be operated with minimal pressure drop (e.g., from about 1.5 psi to about 2.0 psi), the present invention provides the advantage such that the first effect evaporators can be operated at a moderate temperature and pressure (e.g., of about 20 psia and about 109° C., for example), that allows the necessary pressure drops in the second and third effect evaporators while still achieving a third effect steam of a useful temperature and pressure for direct feed to the butanol recovery distillation columns.

Moreover, the various lines leading to and from each of the evaporators can be valved so that any one of the three first effect evaporators 501, 502 and 503, any one the three second effect evaporators 511, 512 and 513, and any one of the three third effect evaporators 521, 522 and 523 can be taken off-line and by-passed for maintenance. The valves for isolating and by-passing an evaporator will be described with reference to evaporator 501. Evaporator 501 is on-line when a steam line valve 320 is open, when a thin stillage intake valve 324 is open, when thin stillage outlet valve 326 is open, when a first effect steam outlet valve 328 is open and when thin stillage bypass valve 322 is closed. When valves 320, 322, 324, 326 and 328 are in this configuration, evaporator 501 receives plant steam for heating, receives thin stillage for evaporation, produces first effect steam for use by the second effect evaporators (evaporators 511, 512 and 513) and produces slightly concentrated stillage for further evaporation by evaporator 502 if evaporator 502 is on-line. Evaporator 501 is off-line when steam line valve 320 is closed, when a thin stillage intake valve 324 is closed, when first effect steam outlet valve 328 is closed and when thin stillage bypass valve 322 is open. When valves 320, 322, 324, 326 and 328 are in this configuration, evaporator 501 does not receive plant steam, thin stillage or even a back flow of first effect steam. When in this configuration, thin stillage 310 bypasses evaporator 501 and flows into evaporator 502. Similarly, if evaporator 502 is off-line, thin stillage 312 bypasses evaporator 502 and flows into evaporator 503; and if evaporator 503 is off-line, thin stillage 313 bypasses evaporator 503 and flows into the second effect evaporator. It should be understood that the other evaporators of the three effects can be valved similar to evaporator 501, and can be put on-line or taken off-line in the same manner, and therefore a detailed discussion for the valves of these evaporators is omitted. Moreover, each of the second and third effect evaporators can have a plant steam line valve similar to steam line valve 320 of the first effect evaporators. Thus, plant steam can be used to supplement or replace the evaporator steam used to operate the subsequent evaporator effects. For example, if one of the evaporators (e.g., first effect evaporator 501) in the evaporation train (e.g., evaporators 501, 511 and 521) is taken off-line, then the evaporator of the subsequent effect in the train (e.g., second effect evaporator 511) can continue to operate with plant steam.

While plant capacity and efficiency can be improved with a greater number of evaporators on-line that generate more steam for use in other unit operations in system 200 (e.g., beer column 220 and solvent column 230, as described above), the valves for isolating and by-passing one or more evaporators allow the flexibility to conduct routine maintenance, cleaning or repair of evaporators as needed with plant downtime being minimized. Depending on the evaporators that may need to be taken off-line, the evaporation train and process settings therefore may also be reconfigured. For example, though not optimal, an entire effect can be taken off-line (e.g. the first effect evaporators) such that the system operates as a three train, two effect evaporation system and second effect vapor is integrated in the system. However, with only two effects in the evaporation concentration process, energy utilization efficiency may be relatively low, and flow rates of thin stillage to the evaporators may need to be reduced in order to achieve a highly concentrated syrup. It is preferable that only one evaporator in each effect be taken off-line at any given time, such that the system can operate as a two train, three effect evaporation system. Thus, third effect steam of an optimal temperature and pressure is still generated to supply heated vapor for operation of the beer and solvent column, as when all evaporators are on-line. Still other options for on-line and off-line evaporator configurations are available. For example, another option is to take offline only one evaporator in the system (e.g., the first first effect evaporator 501) and operate the remaining evaporators 502 and 503 of the first effect, as well as all evaporators of the second and third effects. In this instance, it may be necessary to add make-up plant steam via a make-up steam line (not shown) connected to first effect steam line 388 so as to provide adequate steam to operate all three evaporators of the second effect.

Moreover, each evaporator can have a level sensor in bottom pot portion 545 for detecting concentrated stillage therein, and the lines connected to the evaporator can have flow rate sensors. The various valves can be operated to control the flow rates based on the sensors' feedback. Thus, the stillage flow to each evaporator, for example, can be controlled so as to provide more or less stillage to a particular evaporator based on sensed levels in pot portion 545 of the evaporator. In addition, the steam supplied to each evaporator can be varied by controlling the respective steam inlet valves, thereby ensuring the heat duties are optimized on a per evaporator basis.

In addition, any or each evaporator can have an interphase detector in bottom pot portion 545 for detecting a phase separation. Interphase detection is known in the art and can utilize technologies such as IR, near IR, density measurements. In embodiments, the evaporator vessel can be configured to allow for visual interphase detection. In embodiments where the thin stillage comprises oil (such as oil from the feedstock) or solvent and is thus a two-phase mixture, phase separation can be detected in any evaporator allowing for withdrawal of the organic phase from the stillage before the final syrup is formed. Removal of the organic phase in an evaporator would mean less burden to subsequent evaporators and effects in terms of volume and pumping power. In embodiments where the organic phase comprises solvent, the withdrawn solvent could be recycled for subsequent use in the process.

In addition to the process described with reference to FIG. 3, one of skill in the art equipped with this disclosure will be able to appreciate that additional configurations will also provide advantages without departure from the spirit of the invention. For example, multi-effect evaporation system 600 is described with reference to FIG. 5. Multi-effect evaporation system 600 is formed of two train, quadruple effect evaporators (8 total evaporators) to concentrate thin stillage 274 from separator 270 to syrup 276, which can be fed to dryer 295. The first effect evaporators are evaporators 601 (comprising an upper portion 640 and a lower pot portion 645) and 602. The second effect evaporators are evaporators 611 and 612. The third effect evaporators are 621 and 622. The fourth effect evaporators are 631 and 632. The evaporators can be of any conventional design, as described for example multi-effect evaporation system 280. In this configuration, the fourth effect is the last effect, and the last effect steam can supply heated vapor for operation of the beer and/or solvent column.

Figure 6:
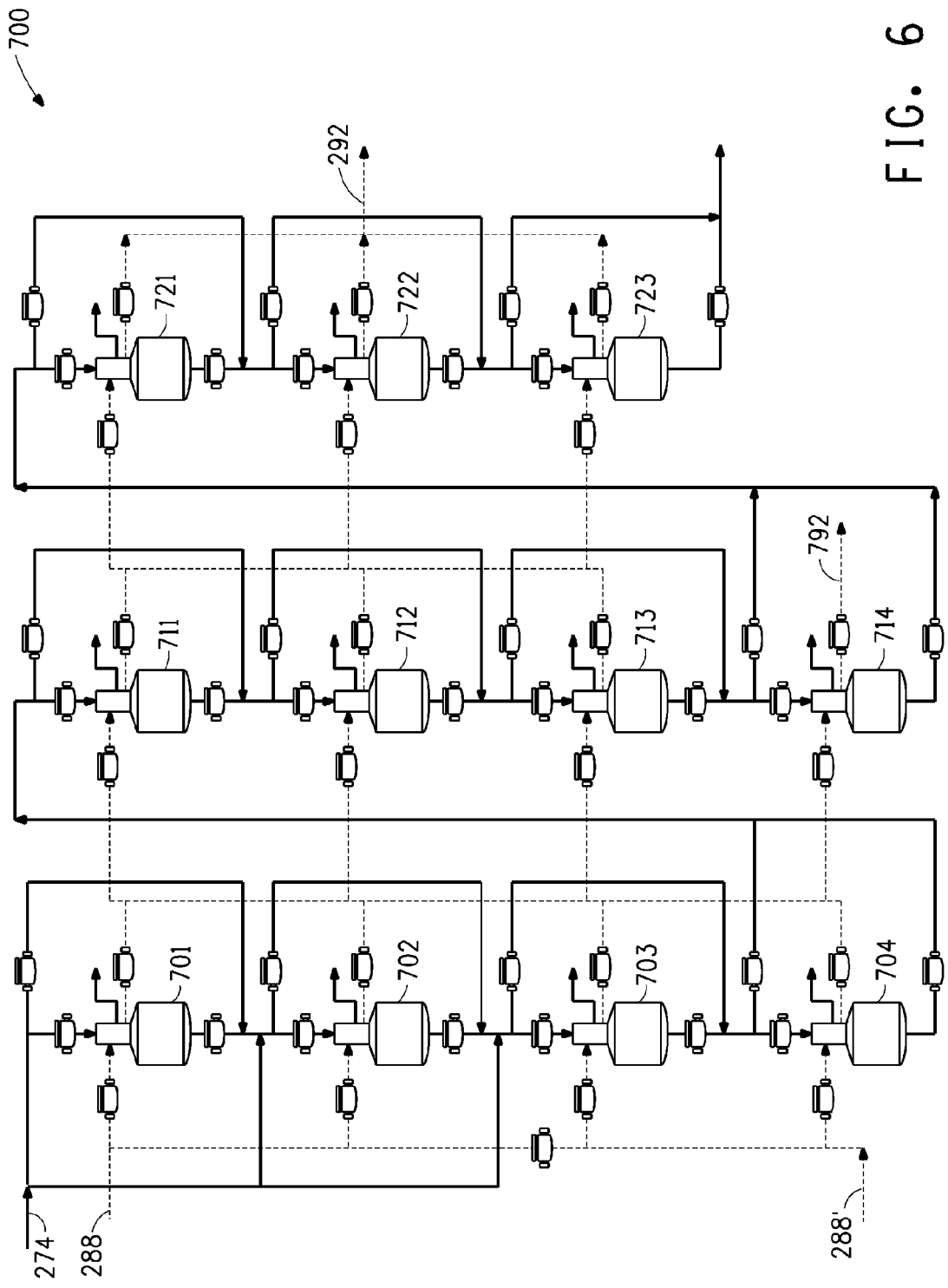
FIG. 6 illustrates a multi-effect evaporator system useful for practicing a process in accordance with an embodiment of the present invention.

As another example, multi-effect evaporation system 700 is described with reference to FIG. 6. Multi-effect evaporation system 700 maintains the four train, double effect evaporators of a conventional ethanol plant design with an addition of a third effect of one to four evaporators (9-12 evaporators) to concentrate thin stillage 274 from separator 270 to syrup 276, which can be fed to dryer 295. The first effect evaporators are evaporators 701, 702, 703, and 704. The second effect evaporators are evaporators 711, 712, 713, and 714. The third effect evaporators are 721, 722, and 723. However, although 3 evaporators are depicted in FIG. 6 for the last effect, in this configuration, the last effect may be comprised of 1, 2, 3, or 4 evaporators. The evaporators can be of any conventional design, as described for example multi-effect evaporation system 280. In this configuration, the third effect is the last effect, and the last effect steam can supply heated vapor for operation of the beer and/or solvent column. The vapor stream 792 can be combined with other second effect vapors or sent to other part of the process directly. Likewise, in other embodiments, a vapor stream from the next to last effect can be sent to a column or other part of the process directly.

The process of the invention can be demonstrated using a computational model of the process. Process modeling is an established methodology used by engineers to simulate complex chemical processes. Process modeling software performs many fundamental engineering calculations, for example mass and energy balances, vapor/liquid equilibrium and reaction rate computations. The modeling of fractionation devices is particularity well established. Calculations based on experimentally determined binary vapor/liquid equilibrium and liquid/liquid equilibrium data can predict reliably the behavior of multi-component mixtures. This capability has been expanded to allow modeling of complex multi-stage, multi-component distillation columns and evaporators using rigorous algorithms like the "inside-out" algorithm developed by Joseph Boston of Aspentech, Inc. of Burlington, Mass. Commercial modeling software, such as Aspen Plus® from Aspentech, can be used in conjunction with physical property databases, such as DIPPR, available from the American Institute of Chemical Engineers, Inc., of New York, N.Y., to develop accurate models and assessments of processes. The following nonlimiting examples will further illustrate the invention.

EXAMPLES

The following comparative examples were obtained through process modeling and illustrate the energy utilization efficiency of alcohol production processes in accordance with the present invention as compared to that of a conventional ethanol production process, for the same dry corn load of 25.5%. Dry corn load is defined as the total dry corn charged into the fermentor on a fermentation batch basis divided by the total weight of material in the fermentor including water. In each example, a corn feed of 50 MM gal/year for mashing, heating and fermenting has the composition of 15 wt % water and the balance dry corn. The dry corn has 70 wt % starch, 9.8 wt % protein and 8 wt % non-fermentable dissolved solids (NFDS).

Example 1

Ethanol Production Process with Four Train, Double Effect Stillage Evaporation

Example 1 provides a process model simulation of a "dry grind" ethanol fermentation production process that follows a process schematic for dry grind ethanol plant 100 as shown and described above with reference to FIG. 1. As depicted in FIG. 1, for this model simulation, stream 194 is divided into streams 126 and 128 to provide heat for operation of the beer column 120 and rectifier 130, respectively. The parameters inputted for the simulations of Example 1 are listed in Table 1. Certain dimensions and heat duty results calculated from the process model are also listed in Table 1. These parameters do not include physical property parameters, parameters relating to miscellaneous feeds to the mashed corn feed (e.g., enzymes, ammonia), mash cooking and saccharification parameters, and those related to convergence and other computational options or diagnostics. In the tables that follow, the abbreviation "EtOH" refers to ethanol.

TABLE 1

| Conditions Used for Modeling Ethanol Process of Example 1 | | | |
|---|---|---|---|
| Equipment blocks | Inputs | Value | Units |
| Corn Feed (102 and 104) | | 50 | MM gal/yr |
| | Corn Feed (liquid phase) | 14120 | kg/hr |
| | Corn Feed (solids) | 41910 | kg/hr |
| Fermentation Portion (110) | Mash Cooker duty | 16913 | MJ/hr |
| | Fermentor Temperature | 90 | deg F. |
| | Fermentor Pressure | 16 | psia |
| | EtOH Titer | 110 | g/L |
| CO2 Degasser (not shown) | degasser temperature | 185 | deg F. |
| | degasser condenser temperature | 100 | deg F. |
| Beer Column (120) | # of theoretical stages (Beer Column has no condenser and reboiler) | 12 | stages |
| | column top pressure | 9.2 | psia |
| | column bottom pressure | 11.5 | psia |
| | column internal diameter | 3 | m |
| | degassed fermented liquid feed (106) location | 1 | stage |
| | Condensate feed (not shown) obtained from further processing of gases removed in Degasser | 1 | stage |
| | evaporator vapor feed (126) location | 12 | stage |
| | ethanol concentration in bottoms product (116) | 100 | ppm |
| Rectifier Column (130) | # of theoretical stages (includes a partial condenser. Overhead inert stream is removed as vapor at equilibrium temperature. Overhead product and reflux are subcooled to 140 deg F.) | 18 | stages |
| | column top pressure | 7 | psia |

TABLE 1-continued

Conditions Used for Modeling Ethanol Process of Example 1

| Equipment blocks | Inputs | Value | Units |
|---|---|---|---|
| | column bottom pressure | 11 | psia |
| | column internal diameter | | |
| | Rectifying section | 4 | m |
| | Stripping section | 2.5 | m |
| | Beer overhead feed (108) location | 10 | stage |
| | molecular sieve regenerate feed (114) location | 7 | stage |
| | Fermentation portion steam feed (129) location | 17 | stage |
| | ethanol in overhead | 90.85 | wt % |
| | ethanol in bottoms | 431 | ppm |
| Scrubber (not shown) | # of theoretical stages (scrubber has no condenser or reboiler) | 3 | stages |
| | pressure | 15 | psia |
| molecular sieves (140) | superheater temperature | 135 | deg C. |
| | superheater pressure | 50 | psig |
| | superheater duty | 27700 | MJ/hr |
| | Fraction of feed exiting with molecular sieve regeneration stream (114) | | |
| | for component H2O | 0.97 | |
| | for component EtOH | 0.16 | |
| | for component CO2 | 0.29 | |
| | EtOH Product (112) temperature | 135 | deg C. |
| | EtOH Product (112) pressure | 50 | psig |
| | Temperature of regenerate cooler/condenser (not shown) | 57 | deg C. |
| | Pressure of regenerate cooler/condenser (not shown) | 14.7 | psia |
| EtOH Product cooler/condenser (145) | evaporator heater inlet temp | 135 | deg C. |
| | evaporator heater outlet temperature | 121 | deg C. |
| | Initial cooler outlet temp | 60 | deg C. |
| | final condenser exit temperature | 68 | deg F. |
| | final condenser exit pressure | 18.5 | psia |
| Centrifuge (160) | solids/total flow in centrifuge tails | 0.287 | wt % |
| DDGS dryer (180) | water concentration in mixed stream (174) to DDGS dryer | 61.5 | wt % |
| | water concentration in DDGS product (182) | 9 | wt % |
| | dryer duty (steam source) | 66359 | MJ/hr |
| Evaporators (150) | water concentration of syrup (158) exiting last 2nd effect evaporator (164) | 61.5 | % |
| | evaporator pressure of 1st effect evaporators (151-153) | 18 | psia |
| | evaporator pressure of last 1st effect evaporator (154) heated by EtOH Product vapor (112') | 20.8 | psia |
| | evaporator temperature of 1st effect evaporators (151-153) | 223 | deg F. |
| | Condensate heater duty for recycled Evaporator condensate to fermentation portion | 10104 | MJ/hr |
| | Heat duty (steam source) 1st effect evaporators (151-153) | 84284 | MJ/hr |
| | evaporator temperature of 2nd effect evaporators (161-163) | 204 | deg F. |
| EtOH Product (112") | EtOH Production | 17765 | kg/hr |
| | EtOH Production Density | 0.79 | g/cc |

Stream results for Example 1 are listed in Table 2. Beer column traffic and liquid mass composition profiles are listed in Table 3. Rectifier column traffic and liquid mass composition profiles are listed in Table 4.

Example 2

Butanol Production Process with Three Train, Triple Effect Stillage Evaporation

Example 2 provides a process model simulation of a "dry grind" butanol fermentation production process that follows a process schematic of system 200 as shown and described above with reference to FIGS. 2 and 3. Example 2 was obtained through process modeling using isobutanol as the butanol isomer and oleyl alcohol as the extractant. Similar results would be expected for the analogous cases where 1-butanol or a mixture of 1-butanol and isobutanol was selected as the butanol isomer, due to the similarity of the physical property data for isobutanol and 1-butanol and the heterogeneous nature of the azeotrope between water and these butanol isomers.

The parameters inputted for the simulations of Example 2 are listed in Table 5. Certain dimensions and heat duty results calculated from the process model are also listed in Table 5. These parameters do not include physical property parameters, parameters relating to miscellaneous feeds to the mashed corn feed (e.g., enzymes, ammonia), mash cooking and saccharification parameters, and those related to convergence and other computational options or diagnostics. In the tables that follow, the abbreviation "OLEYLOH" refers to oleyl alcohol and "I-BUOH" or "BUOH" refers to isobutanol.

TABLE 5

Conditions Used for Modeling Butanol Process of Example 2

| Equipment blocks | Inputs | Value | Units |
|---|---|---|---|
| Corn Feed |  | 50 | MM gal/yr |
|  | Corn Feed (liquid phase) | 17830 | kg/hr |
|  | Corn Feed (solids) | 52922 | kg/hr |
| Mash Feed (202) | Mash Feed (liquids phase) | 148330 | kg/hr |
|  | Mash Feed (solids) | 52763 | kg/hr |
|  | Mash Cooker (not shown) duty | 20594 | MJ/hr |
| Fermentor (210) | Fermentor Temperature | 90 | deg F. |
|  | Fermentor Pressure | 16 | psia |
|  | BUOH Titer | 25 | g/L |
| CO2 Degasser (not shown) | degasser temperature | 201 | deg F. |
|  | degasser condenser temperature | 100 | deg F. |
| Beer Column (220) | # of theoretical stages (Beer Column has no condenser and reboiler) | 10 | stages |
|  | column top pressure | 6.9 | psia |
|  | column bottom pressure | 8.4 | psia |
|  | column internal diameter | 2.2 | m |
|  | degassed fermented liquid feed (212') location | 1 | stage |
|  | Condensate (not shown) from further processing of gases removed in Degasser | Sent directly to Decanter (250) |  |
|  | evaporator vapor feed (294) location | 10 | stage |
|  | butanol concentration in bottoms product (224) | 59 | ppm |
| Solvent Column (230) | # of theoretical stages (Solvent Column has no reboiler and condenser; condenser is simulated in decanter) | 15 | stages |
|  | column top pressure | 6.9 | psia |
|  | column bottom pressure | 8.4 | psia |
|  | column internal diameter | 3.75 | m |
|  | rich solvent feed (208) location | 3 | stage |
|  | aqueous reflux feed (228) location | 1 | stage |
|  | organic reflux feed (234) location | 1 | stage |
|  | evaporator vapor feed (296) location | 15 | stage |
|  | butanol in overhead | 51.25 | wt % |
|  | butanol in bottoms | 13.5 | ppm |
| Butanol Column (260) | # of theoretical stages (Butanol Column has reboiler but no condenser; condenser is simulated in decanter) | 10 | stages |
|  | column top pressure | 6.9 | psia |
|  | column bottom pressure | 7.6 | psia |
|  | column internal diameter | 2.7 | m |
|  | organic reflux feed (236) location | 1 | stage |
|  | butanol in overhead | 65.5 | wt % |
|  | water in bottoms | 100 | ppm |
|  | reboiler duty | 29733 | MJ/hr |
| BUOH Product cooler/condenser (not shown) | final condenser exit temperature | 68 | deg F. |
|  | final condenser exit pressure | 18.5 | psia |
| Scrubber (not shown) | # of theoretical stages (scrubber has no condenser or reboiler) | 7 | stages |
|  | pressure | 15 | psia |
| Centrifuge (270) | solids/total flow in centrifuge tails | 0.287 | wt % |
| DDGS dryer (295) | water concentration in DDGS product (282) | 9 | wt % |
|  | dryer duty (steam source) | 68971 | MJ/hr |
| Evaporators (280) | water concentration of syrup (276) exiting last 3rd effect evaporator (523) | 45 | % |
|  | evaporator pressure of 1st effect evaporators (501-503) | 20 | psia |
|  | evaporator temperature of 1st effect evaporators (501-503) | 229 | deg F. |
|  | Heat duty (steam source) 1st effect evaporators (501-503) | 85492 | MJ/hr |
|  | Condensate heater duty for recycled Evaporator condensate to fermentation portion | 21457 | MJ/hr |
|  | evaporator temperature of 2nd effect evaporators (511-513) | 210 | deg F. |
|  | evaporator temperature of 3rd effect evaporators (521-523) | 191 | deg F. |
| BUOH Product (242) | BUOH Production | 18123 | kg/hr |
|  | BUOH Production Density | 0.805 | g/cc |

Stream results for Example 2 are listed in Table 6. Beer column traffic and liquid mass composition profiles are listed in Table 7. Solvent column traffic and liquid mass composition profiles are listed in Table 8. Butanol column traffic and liquid mass composition profiles are listed in Table 9.

Example 3

Butanol Production Process with Four Train, Double Effect Stillage Evaporation

Figure 4:
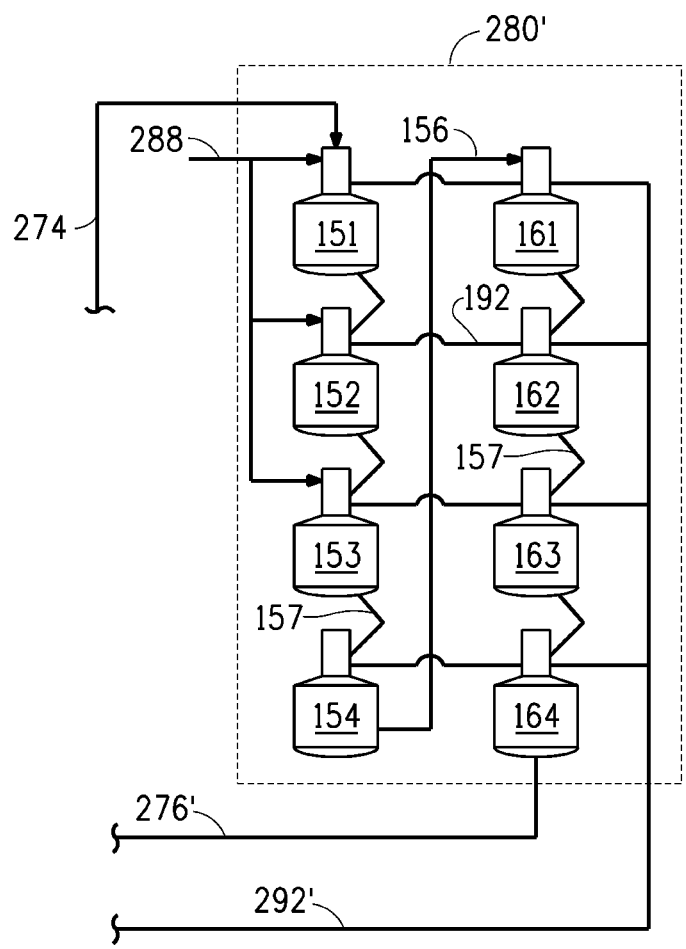
FIG. 4 illustrates a multi-effect evaporator system employed in the process modeling of comparative Example 3.

Example 3 provides a comparative process model simulation of a "dry grind" butanol fermentation production process that substantially follows the process schematic of system 200 as shown and described above with reference to FIG. 2, except that the evaporation system 280 is replaced with a four train, double effect evaporation system 280' shown in FIG. 4. In the evaporation system 280' of FIG. 4, thin stillage 274 is concentrated into a syrup 276' (and then conveyed to mixer 290, see FIG. 2), and the first effect evaporators 151-154 are heated by clean plant steam 288. Second effect steam 292' generated by the second effect evaporators 161-164 exits evaporation system 280' (and is then split into lines 294 and 296 which feed steam to beer column 220 and solvent column 230, see FIG. 2). The four train, double effect evaporation system 280' is configured the same as evaporation system 150 described above with reference to the ethanol production process of FIG. 1 and comparative Example 1, with like reference numbers indicating identical or functionally similar elements. Therefore, a detailed discussion of FIG. 4 is omitted.

The parameters inputted for the simulations of Example 3 are listed in Table 10. Certain dimensions and heat duty results calculated from the process model are also listed in Table 10 These parameters do not include physical property parameters, parameters relating to miscellaneous feeds to the mashed corn feed (e.g., enzymes, ammonia), mash cooking and saccharification parameters, and those related to convergence and other computational options or diagnostics.

TABLE 10

Conditions Used for Modeling Butanol Process of Example 3

| Equipment blocks | Inputs | Value | Units |
| --- | --- | --- | --- |
| Corn Feed | | 50 | MM gal/yr |
| | Corn Feed (liquid phase) | 17826 | kg/hr |
| | Corn Feed (solids) | 52911 | kg/hr |
| Mash Feed (202) | Mash Feed (liquids phase) | 147583 | kg/hr |
| | Mash Feed (solids) | 52752 | kg/hr |
| | Mash Cooker (not shown) duty | 19331 | MJ/hr |
| Fermentor (210) | Fermentor Temperature | 90 | deg F. |
| | Fermentor Pressure | 16 | psia |
| | BUOH Titer | 25 | g/L |
| CO2 Degasser (not shown) | degasser pressure | 16 | psia |
| | degasser condenser temperature | 100 | deg F. |
| Beer Column (220) | # of theoretical stages (Beer Column has no condenser and reboiler) | 10 | stages |
| | column top pressure | 10.3 | psia |
| | column bottom pressure | 11.8 | psia |
| | column internal diameter | 2.65 | m |
| | degassed fermented liquid feed (212') location | 1 | stage |
| | Condensate (not shown) from further processing of gases removed in Degasser | Sent directly to Decanter (250) | |
| | evaporator vapor feed (294) location | 10 | stage |
| | butanol concentration in bottoms product (224) | <1 | ppm |
| Solvent Column (230) | # of theoretical stages (Solvent Column has no reboiler and condenser; condenser is simulated in decanter) | 15 | stages |
| | column top pressure | 6.9 | psia |
| | column bottom pressure | 8.4 | psia |
| | column internal diameter | 3.25 | m |
| | rich solvent feed (208) location | 3 | stage |
| | aqueous reflux feed (228) location | 1 | stage |
| | organic reflux feed (234) location | 1 | stage |
| | evaporator vapor feed (296) location | 15 | stage |
| | Butanol mass purity at bottom | <1 | ppm |
| Butanol Column (260) | # of theoretical stages (Butanol Column has reboiler but no condenser; condenser is simulated in decanter) | 10 | stages |
| | column top pressure | 6.9 | psia |
| | column bottom pressure | 7.6 | Psia |
| | column internal diameter | 2.5 | M |
| | organic reflux feed (236) location | 1 | stage |
| | oleyl alcohol in overhead | 0.01 | wt % |
| | in bottoms | 100 | ppm |
| | reboiler duty | 32065 | MJ/hr |
| BUOH Product cooler/condenser (not shown) | final condenser exit temperature | 104 | deg F. |
| | final condenser exit pressure | 18.5 | psia |

TABLE 10-continued

Conditions Used for Modeling Butanol Process of Example 3

| Equipment blocks | Inputs | Value | Units |
|---|---|---|---|
| Scrubber (not shown) | # of theoretical stages (scrubber has no condenser or reboiler) | 6 | stages |
| | pressure | 15 | psia |
| DDGS dryer (295) | water concentration in DDGS product (282) | 9 | wt % |
| | dryer duty (steam source) | 82458 | MJ/hr |
| Evaporators (280') | evaporator pressure of 1st effect evaporators (151-154) | 18 | psia |
| | evaporator temperature of 1st effect evaporators (151-154) | 223 | deg F. |
| | Heat duty (steam source) 1st effect evaporators (151-154) | 109092 | MJ/hr |
| | Condensate heater duty for recycled Evaporator condensate to fermentation portion | 27212 | MJ/hr |
| | evaporator temperature of 2nd effect evaporators (161-164) | 204 | deg F. |
| | mid stillage water concentration exit 5th evaporator (161) | 85 | wt % |
| | mid stillage water concentration exit 6th evaporator (162) | 81 | wt % |
| | mid stillage water concentration exit 7th evaporator (163) | 73 | wt % |
| | syrup (276') concentration exit 8th evaporator (164) | 61.5 | wt % |
| BUOH Product (242) | BUOH Production | 18119 | kg/hr |
| | BUOH Production Density | 0.805 | g/cc |

Stream results for Example 3 are listed in Table 11. Beer column traffic and liquid mass composition profiles are listed in Table 12. Solvent column traffic and liquid mass composition profiles are listed in Table 13. Butanol column traffic and liquid mass composition profiles are listed in Table 14.

Table 15 compares the overall heat consumption of the processes of Example 1, Example 2 and Example 3 based on heating duties, cooling duties, and duties supplied by process-to-process heat exchange, as calculated from the process model. Table 15 shows that butanol production according to the process of the present invention can surprisingly be a more energy efficient process than the conventional ethanol production process, for the product produced. In particular, butanol has approximately 25% higher energy density than ethanol on a weight basis, and taking into account this energy density difference, the heat consumption per kilogram ethanol is greater than that of the heat consumption per kilogram butanol, for the respective simulations of Examples 1 and 2. In addition, with comparable heat duties between the first effect evaporators of Example 1 (i.e., 84284 MJ/hr) and the first effect evaporators of Example 2 (i.e., 85492 MJ/hr), a more concentrated syrup of 45 wt % water can be produced by the triple effect, three train evaporation system of Example 2 despite having one less evaporation train than in the system of Example 1 that produces a syrup of 61.5 wt % water.

Similarly, a more concentrated syrup of 45 wt % water can be produced by the system of Example 2 despite having one less evaporation train than in the system of Example 3 that produces a syrup of 61.5 wt % water. In addition, in order to obtain a DDGS product having 9 wt % water, the calculated DDGS dryer duty for Example 2 is only 68971 MJ/hr, whereas the calculated DDGS dryer duty for Example 3 is 82458 MJ/hr. Moreover, as shown in Table 15, the heat consumption per kilogram butanol for Example 3 is greater than that for Example 2. This shows that a butanol production process using a four train, double effect evaporation system as simulated in Example 3 is surprisingly overall less energy efficient than a butanol production process using a triple train, triple effect evaporation system according to the present invention.

TABLE 15

Overall Heat Consumption (Q) for Processes of Examples 1, 2 and 3

| Example 1 | | Example 2 | | Example 3 | |
|---|---|---|---|---|---|
| Q/corn (KJ/kg) | 3665 | Q/corn (KJ/kg) | 3198 | Q/corn (KJ/kg) | 3819 |
| Q/EtOH (KJ/kg) | 11560 | Q/BUOH (KJ/kg) | 12484 | Q/BUOH (KJ/kg) | 14910 |
| Q/EtOH (KJ/L) | 9116 | Q/BUOH (KJ/L) | 9803 | Q/BUOH (KJ/L) | 11708 |

Example 4

Ethanol Production Process with Three Train, Double Effect Stillage Evaporation

Example 4 provides a process model simulation of the "dry grind" ethanol fermentation production process using the same process schematic and substantially the same modeling parameters as used in Example 1 (see FIG. 1 and Table 1), but instead with one evaporation train of the evaporation system 150 excluded from the process model. In Example 4, minor variations from the process modeling parameters used in Example 1 include operation of the regenerate cooler/condenser at 39° C., the evaporator heater inlet temperature at 115.5° C. and outlet temperature at 111.6° C. In addition, Example 4 simulates production of a syrup (158) that is 60 wt % water and dried (in DDGS dryer 180) to 9 wt % water concentration. Example 4 simulates the scenario of operating the ethanol plant 100 of FIG. 1 with a three train, double effect evaporation system as a result of by-passing one evaporation train that is taken off-line for cleaning or maintenance. In particular, the process model simulation of Example 4 resembles Example 1 but with the evaporation train constituted by the first effect evaporator 153 and second effect evaporator 163 excluded from the process schematic. Thus, stillage exiting first effect evaporator 152 is fed to last first effect evaporator 154, and stillage exiting second effect evaporator 162 is fed to last second effect evaporator 164. Example 4 Table 16 provides the overall heat consumption of the process of Example 4 based on heating duties, cooling duties, and duties supplied by process-to-process heat exchange, as calculated from the process model.

Example 5

Butanol Production Process with Two Train, Triple Effect Stillage Evaporation

Example 5 provides a process model simulation of the "dry grind" butanol fermentation production process using the same process schematic and substantially the same modeling parameters as used in Example 2 (see FIGS. 2 and 3 and Table 5), but instead with one evaporation train of the evaporation system 280 excluded from the process model. Example 5 simulates the scenario of operating the system 200 of FIGS. 2 and 3 for butanol recovery with a two train, triple effect evaporation system as a result of by-passing one evaporation train that is taken off-line for cleaning or maintenance. In particular, the process model simulation of Example 5 resembles Example 2 but with the evaporation train constituted by the first effect evaporator 502, second effect evaporator 512 and third effect evaporator 522 excluded from the process schematic. Thus, stillage exiting first effect evaporator 501 is fed to last first effect evaporator 503, stillage exiting second effect evaporator 511 is fed to last second effect evaporator 513, and stillage exiting third effect evaporator 521 is fed to last third effect evaporator 523. Example 5 simulates production of a syrup (276) that is 45 wt % water and dried (in DDGS dryer 295) to 9 wt % water concentration. Table 16 provides the overall heat consumption of the process of Example 5 based on heating duties, cooling duties, and duties supplied by process-to-process heat exchange, as calculated from the process model.

Example 6

Butanol Production Process with Three Train, Double Effect Stillage Evaporation

Example 6 provides a process model simulation of the "dry grind" butanol fermentation production process using the same process schematic and substantially the same modeling parameters as used in Example 3 (see FIGS. 2 and 4 and Table 10), but instead with one evaporation train of the evaporation system 280' excluded from the process model. In addition, in Example 6, the beer and solvent columns have a top pressure of 8.8 psia and a bottom pressure of 10.3 psia, and the butanol column has a top pressure of 8.8 psia and a bottom pressure of 9.6 psia. Example 6 simulates the scenario of operating the system 200 for butanol recovery using with a three train, double effect evaporation system as a result of by-passing one evaporation train that is taken off-line for cleaning or maintenance. In particular, the process model simulation of Example 6 resembles Example 3 but with the evaporation train constituted by the first effect evaporator 153 and second effect evaporator 163 excluded from the process schematic. Thus, stillage exiting first effect evaporator 152 is fed to last first effect evaporator 154, and stillage exiting second effect evaporator 162 is fed to last second effect evaporator 164. Example 6 simulates production of a syrup (276') that is 61.5 wt % water and dried (in DDGS dryer 295) to 9 wt % water concentration. Table 16 provides the overall heat consumption of the process of Example 6 based on heating duties, cooling duties, and duties supplied by process-to-process heat exchange, as calculated from the process model.

TABLE 16

Overall Heat Consumption (Q) for Processes of Examples 4, 5 and 6

| Example 4 | | Example 5 | | Example 6 | |
| --- | --- | --- | --- | --- | --- |
| Q/corn (KJ/kg) | 3622 | Q/corn (KJ/kg) | 3198 | Q/corn (KJ/kg) | 3825 |
| Q/EtOH (KJ/kg) | 11422 | Q/BUOH (KJ/kg) | 12485 | Q/BUOH (KJ/kg) | 14931 |
| Q/EtOH (KJ/L) | 9007 | Q/BUOH (KJ/L) | 9803 | Q/BUOH (KJ/L) | 11724 |

Table 16 shows that butanol production according to the process of the present invention can be a more energy efficient process than the conventional ethanol production process, for the product produced, even when an evaporation train is taken off-line during concentration of the stillage by-products. Table 16 also shows that butanol production employing a two train, triple effect evaporation system for stillage concentration according to the process of the present invention can be a more energy efficient process than a butanol production process that operates with a three train, double effect evaporation system. This exemplary improved energy efficiency and flexibility of the systems and processes of the present invention provides the advantage of making commercial production of alcohol fuel from renewable resources, along with the production of livestock feed from the stillage by-products, an economical, environmentally friendly and flexible manufacturing process.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

All publications, patents and patent applications mentioned in this specification are indicative of the level of skill of those skilled in the art to which this invention pertains, and are herein incorporated by reference to the same extent as if each individual publication, patent or patent application was specifically and individually indicated to be incorporated by reference.

What is claimed is:

1. A method for separating butanol from a fermented feed and concentrating thin stillage into syrup, comprising:
    separating at least a portion of a fermented feed comprising a solvent into a solvent-rich portion and a solvent-poor portion,
    separating the solvent-poor portion in a beer column to produce a butanol-rich vapor and a butanol-poor beer bottoms including thin stillage comprising solvent;
    separating the solvent-rich portion in a solvent column to produce a solvent-poor and butanol-rich vapor and a solvent-rich and butanol-poor liquid, the solvent column being operated in parallel with the beer column and maintained at a pressure below atmospheric pressure;
    evaporating water from the thin stillage to produce a first mid stillage and a first effect steam using at least two first effect evaporators arranged in series;
    evaporating water from the first mid stillage produced with heat from the first effect steam to produce a second mid stillage and a second effect steam using at least two second effect evaporators arranged in series;
    evaporating water from the second mid stillage produced with heat from the second effect steam to produce a syrup using at least one third effect evaporator; and
    using at least a portion of a last effect steam produced by a last effect evaporator to supply heat for the beer column, the solvent column, or a combination thereof.

2. The method of claim 1, comprising three effects comprising three first effect evaporators arranged in series, three second effect evaporators arranged in series, and three third effect evaporators arranged in series.

3. The method of claim 1, comprising four effects comprising two first effect evaporators arranged in series, two second effect evaporators arranged in series, two third effect evaporators arranged in series, and further comprising two fourth effect evaporators arranged in series.

4. The method of claim 1, comprising three effects comprising four first effect evaporators arranged in series, four second effect evaporators arranged in series, and at least one third effect evaporator.

5. The method of claim 4, comprising two to four third effect evaporators arranged in series.

6. The method of claim 1, wherein the thin stillage primarily includes water.

7. The method of claim 1, wherein the solvent comprises at least one of $C_{12}$ to $C_{22}$ fatty alcohols, $C_{12}$ to $C_{22}$ fatty acids, esters of $C_{12}$ to $C_{22}$ fatty acids, $C_{12}$ to $C_{22}$ fatty aldehydes, or $C_{12}$ to $C_{22}$ fatty amides.

8. The method of claim 1, further comprising:
    condensing the butanol-rich vapor produced in the beer column to produce a first butanol-rich liquid;
    condensing the solvent-poor vapor produced in the solvent column to produce a solvent-poor liquid;
    combining the first butanol-rich liquid and the solvent-poor liquid to produce a liquid including butanol;
    separating the liquid including butanol to produce a second butanol-rich liquid and a butanol-poor liquid; and
    distilling the second butanol-rich liquid in a distillation column to produce a liquid bottom product of substantially 100 wt % butanol.

9. The method of claim 1, wherein the first effect evaporators are arranged so that one of the evaporators can be bypassed while the remaining first effect evaporators continue to operate.

10. The method of claim 1, wherein the second effect evaporators are arranged so that one of the evaporators can be bypassed while the remaining second effect evaporators continue to operate.

11. The method of claim 2, wherein the second effect evaporators are arranged so that one of the evaporators can be bypassed while the remaining second effect evaporators continue to operate.

12. The method of claim 1, wherein the third effect evaporators are arranged so that one of the evaporators can be bypassed while the remaining third effect evaporators continue to operate.

13. The method of claim 2, wherein the third effect evaporators are arranged so that one of the evaporators can be bypassed while the remaining third effect evaporators continue to operate.

14. The method of claim 3, wherein the fourth effect evaporators are arranged so that one of the evaporators can be bypassed while the remaining third effect evaporators continue to operate.

15. The method of claim 1, further comprising feeding the thin stillage produced in the beer column to the first effect evaporators in parallel.

16. The method of claim 1, further comprising using plant steam to supply sufficient heat for evaporating water from the thin stillage in the first effect evaporators.

* * * * *